US012211453B2

(12) United States Patent
Yin et al.

(10) Patent No.: US 12,211,453 B2
(45) Date of Patent: Jan. 28, 2025

(54) DRIVER CIRCUIT, DRIVING METHOD OF THE DRIVER CIRCUIT, ARRAY SUBSTRATE, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Kaimin Yin, Beijing (CN); Wei Hao, Beijing (CN); Lingyun Shi, Beijing (CN); Wenchieh Huang, Beijing (CN); Feifei Wang, Beijing (CN); Wengang Su, Beijing (CN); Rui Shi, Beijing (CN); Xingce Shang, Beijing (CN); Junwei Zhang, Beijing (CN); Taotao Duan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,716

(22) PCT Filed: Jun. 21, 2021

(86) PCT No.: PCT/CN2021/101304

§ 371 (c)(1),
(2) Date: Jan. 18, 2023

(87) PCT Pub. No.: WO2022/266810

PCT Pub. Date: Dec. 29, 2022

(65) Prior Publication Data

US 2023/0282172 A1 Sep. 7, 2023

(51) Int. Cl.
*G09G 3/3283* (2016.01)

(52) U.S. Cl.
CPC .................................. *G09G 3/3283* (2013.01)

(58) Field of Classification Search
None
See application file for complete search history.

(56) References Cited

U.S. PATENT DOCUMENTS 10,950,194 B1 3/2021 Chan et al.
11,837,151 B2 * 12/2023 Park ........................ H01L 25/16
(Continued)

FOREIGN PATENT DOCUMENTS

CN 101119190 A 2/2008
CN 101336026 A 12/2008
(Continued)

OTHER PUBLICATIONS

Written Opinion from PCT/CN2021/101304 dated Mar. 22, 2022.
(Continued)

*Primary Examiner* — Matthew Yeung
(74) *Attorney, Agent, or Firm* — Calfee, Halter & Griswold LLP

(57) ABSTRACT

The present disclosure provides a driver circuit, a driving method of the driver circuit, an array substrate and a display device, belonging to the field of display technology. The driver circuit provided by the present disclosure includes a logic control module, a data pin and at least two output pins. The data pin is configured to receive driving data. The logic control module is configured to generate driving control signals in a one-to-one correspondence with the at least two output pins according to the driving data. The driving control signals are configured to control the current flowing through the corresponding output pins.

16 Claims, 9 Drawing Sheets

(56) References Cited

U.S. PATENT DOCUMENTS

| | | | |
|---|---|---|---|
| 2007/0139316 A1 | 6/2007 | Hyatt | |
| 2011/0096099 A1 | 4/2011 | Yamamoto et al. | |
| 2012/0139823 A1 | 6/2012 | Fujiwara et al. | |
| 2014/0168037 A1* | 6/2014 | Sakariya | H01L 25/0753 345/82 |
| 2016/0364354 A1 | 12/2016 | Lin et al. | |
| 2021/0056893 A1 | 2/2021 | Wei et al. | |
| 2021/0104202 A1 | 4/2021 | Chan et al. | |

FOREIGN PATENT DOCUMENTS

| | | | |
|---|---|---|---|
| CN | 201307949 | Y | 9/2009 |
| CN | 101336026 | B | 7/2012 |
| CN | 203984442 | U | 12/2014 |
| CN | 204904803 | U | 12/2015 |
| CN | 107657900 | A | 2/2018 |
| CN | 109036260 | A | 12/2018 |
| CN | 109323135 | A | 2/2019 |
| CN | 109859681 | A | 6/2019 |
| CN | 209084426 | U | 7/2019 |
| CN | 212183774 | U | 12/2020 |
| CN | 112489588 | A | 3/2021 |
| EP | 909972 | A2 | 4/1999 |
| EP | 1964378 | A1 | 9/2008 |
| EP | 2299434 | A1 | 3/2011 |
| TW | 200400484 | | 1/2004 |
| TW | M601945 | U | 9/2020 |
| WO | 2007073408 | A1 | 6/2007 |
| WO | 2010004871 | A1 | 1/2010 |

OTHER PUBLICATIONS

International Search Report from PCT/CN2021/101304 dated Mar. 22, 2022.

Office action from Taiwanese application No. 11220031660 dated Jan. 9, 2012.

Communication from European Application No. 21946312.2 dated Nov. 23, 2023.

* cited by examiner

DRIVER CIRCUIT, DRIVING METHOD OF THE DRIVER CIRCUIT, ARRAY SUBSTRATE, AND DISPLAY DEVICE

CROSS-REFERENCE TO RELATED APPLICATIONS

The present application is the U.S. National phase application of International Application No. PCT/CN2021/101304, filed on Jun. 21, 2021, the entire contents of which are hereby incorporated by reference in its entirety.

TECHNICAL FIELD

The present disclosure relates to the field of display technology, and in particular, to a driver circuit, a driving method of the driver circuit, an array substrate and a display device.

BACKGROUND

In a liquid crystal display device, a light emitting diode (LED) array substrate with local dimming function may be used as a backlight source. By integrating a driver chip on the LED array substrate, the problems of high control complexity and easy flickering from discontinuous light emitting by the LED array caused by a traditional passive row-column scanning control method may be overcome.

It should be noted that the above information disclosed in the background section is intended only to enhance the understanding of the background of the present disclosure, and may therefore include information that does not constitute the prior art known to those of ordinary skill in the art.

SUMMARY

The present disclosure provides a driver circuit, a driving method of the driver circuit, an array substrate and a display device.

According to a first aspect of the present disclosure, there is provided a driver circuit including a logic control module, a data pin and at least two output pins. The data pin is configured to receive driving data. The logic control module is configured to generate driving control signals in a one-to-one correspondence with the at least two output pins according to the driving data. The driving control signals are configured to control the current flowing through the corresponding output pins.

According to a second aspect of the present disclosure, there is provided a driving method of a driver circuit. The driver circuit includes at least two output pins. The driving method of the driver circuit includes: in a device control stage, receiving driving data, generating, according to the driving data, driving control signals in a one-to-one correspondence with the at least two output pins, where the driving control signals are configured to control the current flowing through the corresponding output pins.

According to a third aspect of the present disclosure, there is provided an array substrate, including a plurality of device control areas arranged in an array. In any one of the plurality of device control areas, the array substrate is provided with the driver circuit as described in the first aspect, and device units in a one-to-one correspondence with the at least two output pins of the driver circuit, where any one of the device units includes one functional element or a plurality of electrically connected functional elements.

According to a fourth aspect of the present disclosure, there is provided a display device including the array substrate as described in the third aspect.

It should be understood that the above general description and the following detailed description are only exemplary and explanatory, and cannot limit the present disclosure.

BRIEF DESCRIPTION OF THE DRAWINGS

The drawings herein, which are incorporated in and constitute a part of the specification, illustrate embodiments consistent with the present disclosure, and serve to explain the principles of the present disclosure together with the description. Obviously, the following described drawings are only some embodiments of the present disclosure. For those of ordinary skill in the art, other drawings may be obtained based on these drawings without creative efforts.

DETAILED DESCRIPTION

Figure 1:
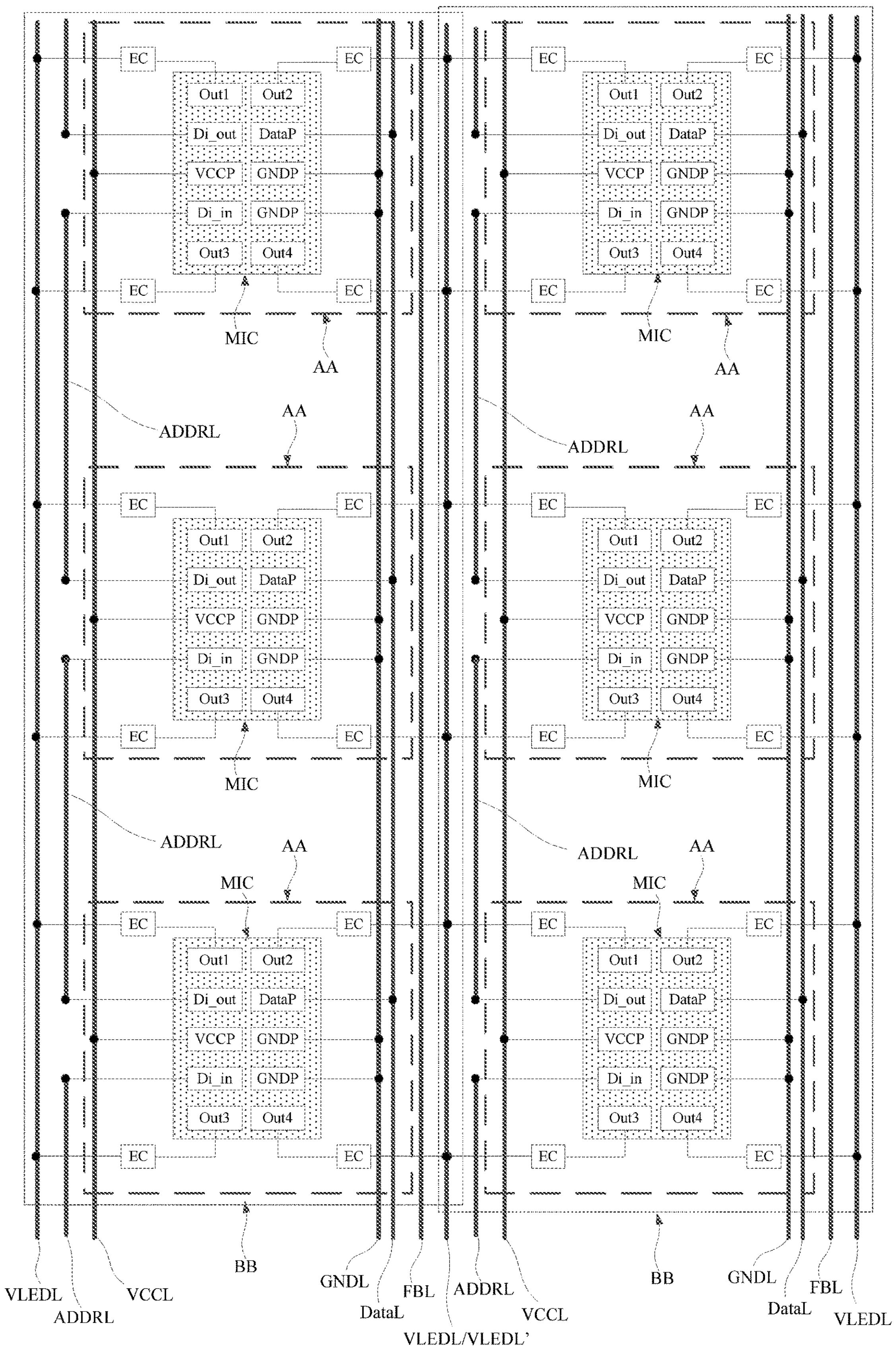
FIG. 1 is a schematic diagram of a partial position of an array substrate according to an embodiment of the present disclosure.

Exemplary embodiments will now be described more fully with reference to the accompanying drawings. The exemplary embodiments, however, can be embodied in various forms and should not be construed as limited to the embodiments set forth herein; rather, these embodiments are provided so that this disclosure will be thorough and complete, and will fully convey the concept of exemplary embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

In the drawings, the thickness of regions and layers may be exaggerated for clarity. The same reference numerals in the drawings denote the same or similar structures, and thus their detailed descriptions will be omitted. The described features, structures, or characteristics may be combined in any suitable manner in one or more embodiments. In the following description, numerous specific details are provided in order to give a thorough understanding of the embodiments of the present disclosure. However, one skilled in the art will appreciate that the technical solutions of the present disclosure may be practiced without one or more of the specific details, or other methods, components, materials, etc. may be employed. In other instances, well-known structures, materials, or operations are not shown or described in detail to avoid obscuring the main technical idea of the present disclosure.

When a certain structure is "on" other structures, it may mean that the structure is integrally formed on other structures, or that the structure is "directly" disposed on other structures, or that the structure is "indirectly" disposed on other structures through another structure.

The terms such as "a", "an", "the", and "at least one" are used to indicate the presence of one or more elements/components/etc. The terms "comprising" and "including" are used to indicate an open-ended inclusion and means that additional elements/components/etc. may be present in addition to the listed elements/components/etc. The terms "first", "second" and "third" etc. are used only as labels and are not intended to limit the number of their objects.

Figure 8:
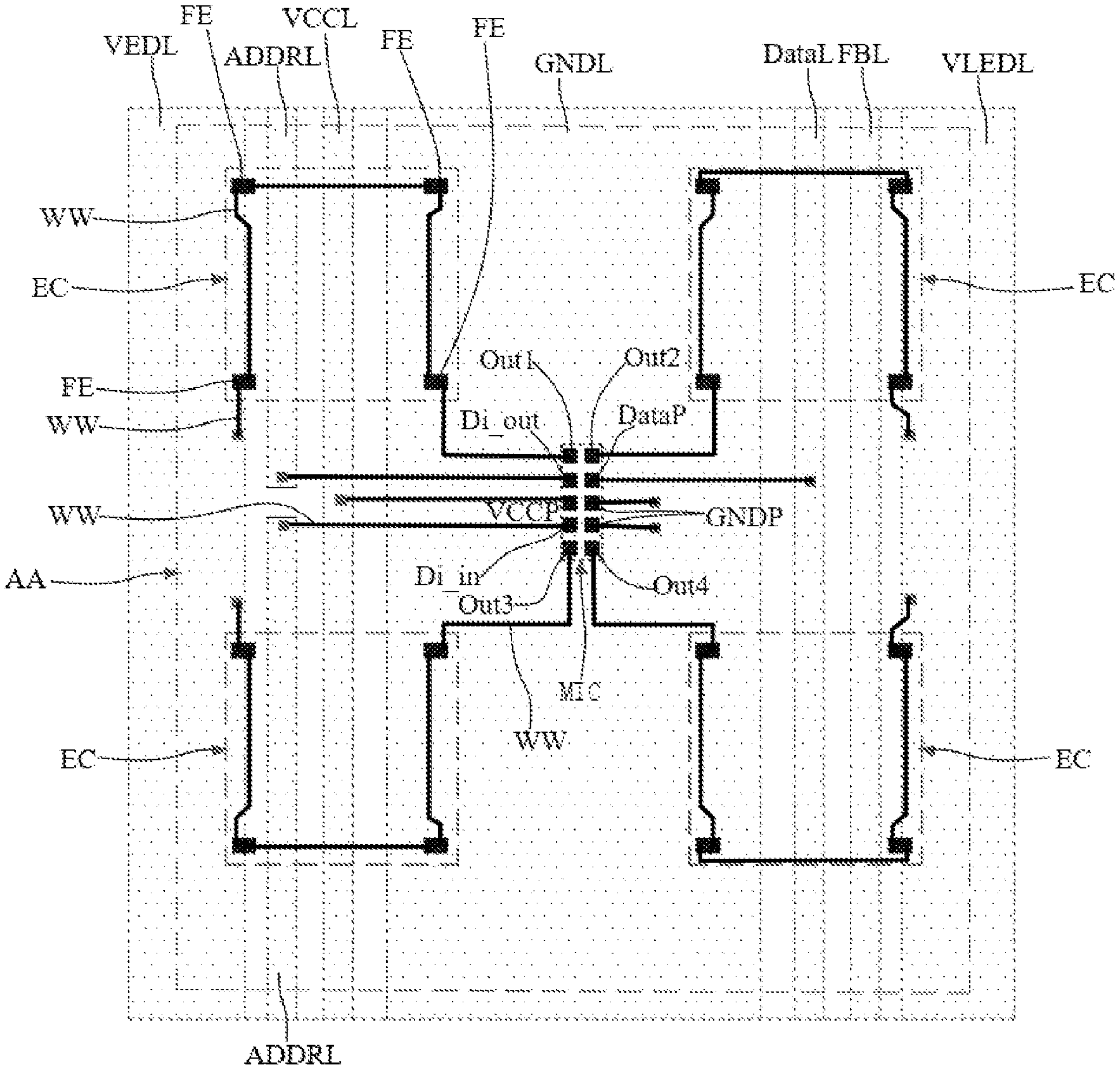
FIG. 8 is a schematic structural diagram of a control area according to an embodiment of the present disclosure.

The present disclosure provides a driver circuit, and an array substrate and a display device applying the driver circuit. FIG. 1 is a schematic diagram of a partial position of the array substrate. Referring to FIG. 1, the array substrate provided by the present disclosure includes a plurality of device control areas AA arranged in an array. In any one of the device control areas AA, the array substrate is provided with a driver circuit MIC and device units EC driven by the driver circuit MIC. Referring to FIG. 8, any one of the device units EC may include one functional element or may include a plurality of functional elements FE in an electrical connection relationship. Optionally, referring to FIG. 1, the device control areas AA are arranged into a plurality of device control area columns BB, and any one of the device control area columns BB includes the plurality of device control areas AA arranged in sequence along a column direction. Further, in one device control area column BB, the driver circuits MIC may be linearly arranged in the column direction.

It can be understood that, FIG. 1 is only used to illustrate the electrical connection relationship among the driver circuits MIC, the device units EC and respective wires. In FIG. 1, in order to show the electrical connection relationship more clearly, the dimensions of the driver circuits MIC, the device units EC and the respective wires are not drawn to scale. The relative positional relationship among the driver circuits MIC, the device units EC and the respective wirings may not be shown according to the actual position.

Optionally, in the present disclosure, the driver circuit MIC may be an integrated circuit, especially a packaged chip with pins.

In the present disclosure, the functional elements may be current-driven electronic elements, such as heating elements, light-emitting elements, sound-emitting elements, and the like; or electronic elements that realize a sensing function, such as photosensitive elements, thermal elements, acoustic-electrical transducer elements, and the like. Any device unit EC may include one kind of functional element, and may also include a variety of different electronic elements. The number, type, relative position and electrical connection manner of the functional elements included in any two device units EC may be the same or different.

Optionally, referring to FIG. 1, the device units EC may be distributed in an array, so as to improve the uniformity of the distribution of the device units EC and the uniformity of the array substrate. In some embodiments of the present disclosure, the functional elements in the device unit EC are the same functional element, for example, they are all light-emitting elements. On the array substrate, the functional elements are distributed in an array, thereby ensuring the uniformity of the distribution of the functional elements on the entire array substrate, and further improving the uniformity of the array substrate. Further, in each device unit EC, the number, type, relative position and electrical connection of functional elements are completely the same, for example, they are all light-emitting elements; and thus, each device unit EC is the same, which facilitates the driving and debugging of the array substrate.

Optionally, at least some of the functional elements in the device units EC may be light-emitting elements, such as light-emitting diodes (LEDs), micro light-emitting diodes (Micro LEDs), Mini light-emitting diodes (mini LEDs), organic electroluminescent diodes (OLEDs), quantum dot-organic electroluminescent diodes (QD-OLEDs), quantum dot light-emitting diodes (QLEDs), organic polymer electroluminescent diodes (PLEDs), and the like. In this embodiment, the array substrate may emit light under the driving of the driver circuits MIC, and may be applied to equipment such as display devices and lighting devices.

In some embodiments, each functional element in the device units EC is a light-emitting element, and light-emitting elements on the array substrate are distributed in an array. A display device may be a liquid crystal display device, which includes a stacked liquid crystal display module and a backlight module, and the array substrate may be used as a backlight source of the backlight module. In this embodiment, each device unit EC can work independently under the driving of the driver circuits MIC, so that each device unit EC can emit light independently. In this way, the display device can realize local dimming and realize high-dynamic range (HDR) effect to improve the display quality of the display device. In any device unit EC, the number and electrical connection of functional elements are the same. In this way, the uniformity of the distribution of the light-emitting elements on the array substrate can be ensured, which is beneficial to improve the uniformity of the light-emitting of the array substrate and reduce the difficulty of debugging the backlight module.

In other embodiments, the display device may be a Micro LED display device, in which the light-emitting elements (e.g., Micro LEDs, LEDs, etc.) as functional elements may emit light to directly display images. In one embodiment, the light-emitting elements may be light-emitting elements capable of emitting light of the same color, for example, all of them may be blue LEDs, red LEDs, green LEDs or yellow LEDs. In this way, the display device may be a monochrome display device, which may be a display device such as an instrument dial, a signal indicating screen, or the like. In other embodiments, the light-emitting elements may include a plurality of light-emitting elements of different colors, for example, they may include at least two types of red LEDs, green LEDs, blue LEDs, yellow LEDs, and the like, and the light-emitting elements of different colors may be independently controlled. In this way, the display device may perform color display by mixing light.

Further, in an embodiment of the present disclosure, the functional elements on the array substrate are distributed in an array at equal intervals in the row and column directions. Specifically, the functional elements may be arranged into a plurality of element rows, the plurality of element rows are arranged at equal intervals along the column direction, and each element row includes a plurality of functional elements arranged at equal intervals along the row direction. The functional elements may also be arranged into a plurality of element columns, the plurality of element columns are arranged at equal intervals along the row direction, and each element column includes a plurality of functional elements arranged at equal intervals along the column direction. In this way, the uniformity of the distribution of the functional elements on the array substrate can be further improved.

Optionally, in at least a partial area of the array substrate, various driver circuits MIC are distributed in an array. In this way, the difficulty of designing and preparing the array substrate may be reduced, the difficulty of debugging the array substrate may be reduced, and the cost of the array substrate and the display device may be reduced. In some embodiments, the driver circuits MIC are distributed in an array on the array substrate, and further, the relative position of each driver circuit MIC with respect to the device unit EC driven by the driver circuit MIC may be the same. In other embodiments, referring to FIG. 9, the array substrate may include adjacent first and second areas C1 and C2, in which the driver circuits MIC located in the first area are distributed in an array, the driver circuits MIC located in the second area are distributed in an array, and the driver circuits MIC are not distributed in an array in the first area and the second area as a whole. Further, the relative position of the driver circuit MIC in the first area C1 relative to the device unit EC driven by the driver circuit MIC may be different from the relative position of the driver circuit MIC in the second area C2 relative to the device unit EC driven by the driver circuit MIC. Further, the array substrate has a bonding area, and the bonding area is provided with a circuit board bonding pad for bonding and connection with an external circuit (for example, a circuit board, a flexible circuit board, a chip on film, and the like). The second area may be located at an end of the array substrate close to the bonding area, and the first area may be located at a side of the second area away from the bonding area.

Figure 9:
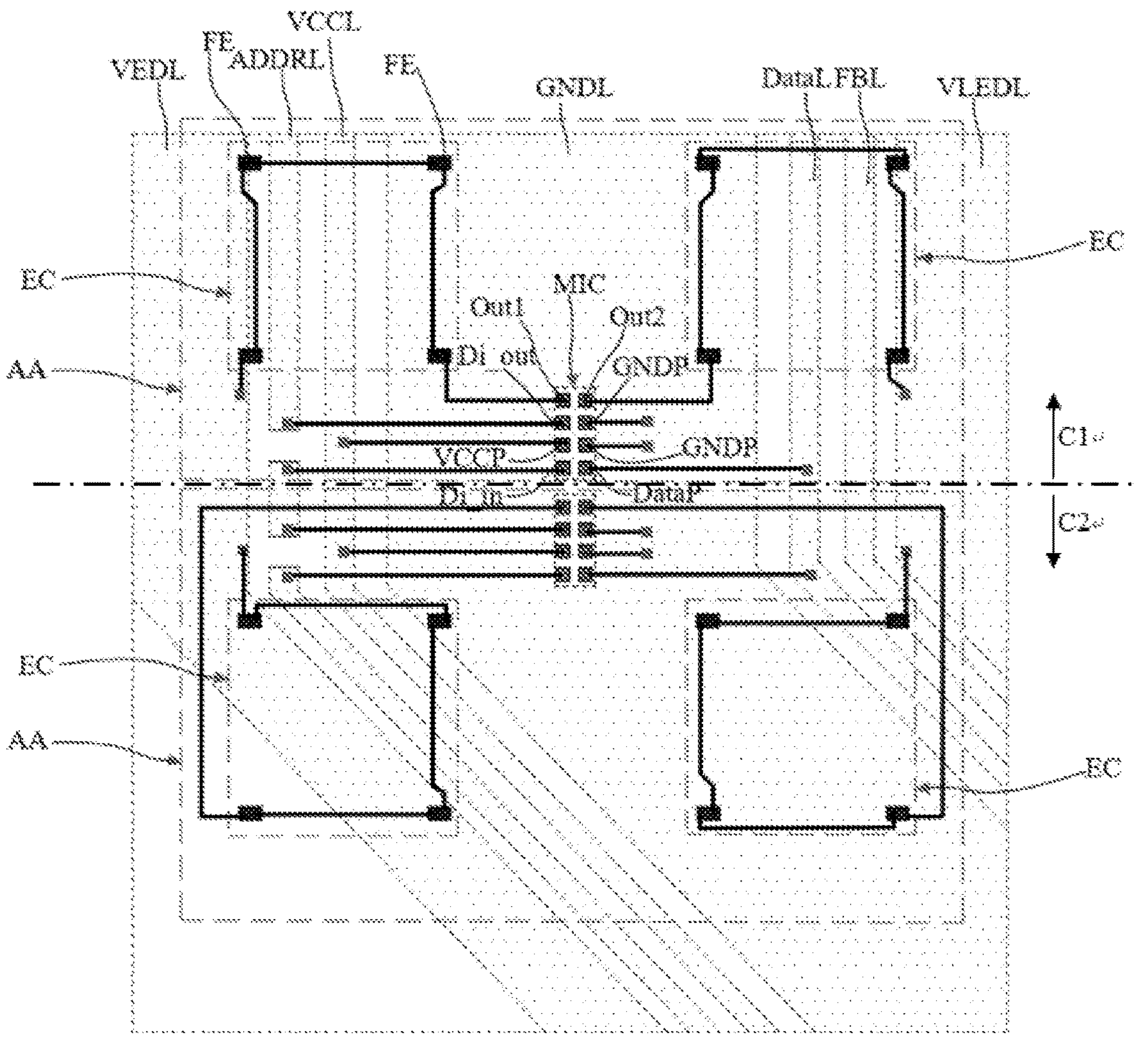
FIG. 9 is a schematic structural diagram of two control areas adjacent to a bonding area according to an embodiment of the present disclosure.

Exemplarily, in one embodiment of the present disclosure, as shown in FIG. 9, the driver circuit MIC has two output pins OUTP (e.g., Out1 and Out2) for driving two device units EC. The array substrate is provided with a fan-out area and a bonding area, and the fan-out area has fan-out wirings electrically connected to a circuit board bonding pad in the bonding area, and the fan-out wirings are also connected with the drive wirings of the driver circuit MIC and the device unit EC. In the array substrate, the respective device control areas AA closest to the bonding area form the second area C2, and the remaining control areas AA may form the first area C1. In this way, the second area C2 may be overlapped with the fan-out area, and in particular, the respective device units EC in the second area C2 may be overlapped with the fan-out area. In a control area AA of the second area C2, the driver circuit MIC may be located on a side of the two device units EC away from the bonding area. In a control area AA in the first area C1, the driver circuit MIC may be located on a side of the two device units EC close to the bonding area.

It can be understood that the array substrate of the present disclosure is integrated with the driver circuits for driving the device units, which can simplify the external circuit for driving the array substrate and simplify the control method of the external circuit, thereby facilitating the miniaturization of the external circuit. In particular, on the one hand, the volume of the integrated circuit in the external circuit may be reduced, thereby reducing the cost of the integrated circuit, and on the other hand, the area of the circuit board in the external circuit may be reduced.

Figure 3:
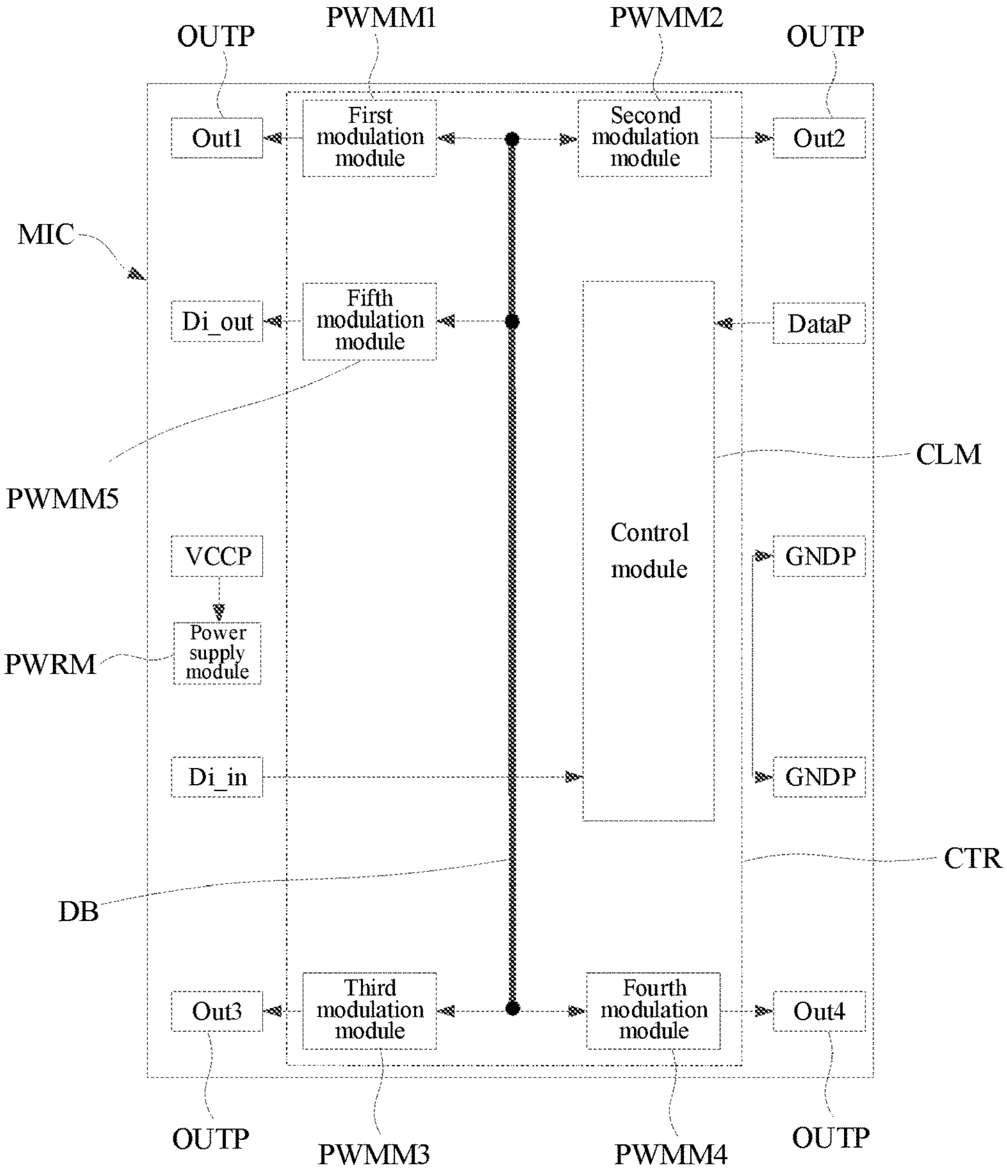
FIG. 3 is a schematic diagram of a driver circuit according to an embodiment of the present disclosure.

Referring to FIG. 3, the driver circuit MIC provided by the present disclosure includes a logic control module CTR, a data pin DataP and at least two output pins OUTP. The data pin DataP is configured to receive driving data Data. The logic control module CTR is configured to generate driving control signals in a one-to-one correspondence with the at least two output pins OUTP according to the driving data Data, and the driving control signals are configured to control the current flowing through the corresponding output pins OUTP. Referring to FIGS. 1 and 3, in any device control area AA, the device units EC on the array substrate are arranged in a one-to-one correspondence with respective output pins OUTP of the driver circuit MIC. On the entire array substrate, each of the device units EC is arranged in a one-to-one correspondence with each of the output pins OUTP.

In this way, the driver circuit MIC may be driven by the following driving method: in a device control stage, receiving driving data Data, and generating driving control signals in a one-to-one correspondence with the at least two output pins OUTP according to the driving data Data, where the driving control signals are configured to control the current flowing through the corresponding output pins OUTP.

According to the driving method, the logic control module CTR of the driver circuit MIC may control the current flowing through the output pins OUTP according to the driving data Data, and in turn control the driving current flowing through the device units EC electrically connected to the output pins OUTP, so as to realize the control and drive of the device units EC. The driver circuit MIC according to the present disclosure may drive at least two device units EC simultaneously, such that the number of driver circuits MIC in the array substrate may be reduced and the cost of the array substrate is reduced. Furthermore, because the number of driver circuits MIC is reduced, the difficulty of preparing the array substrate may also be reduced, the impact of the driver circuit bonding yield on the yield of the array substrate may be reduced, and thus the yield of the array substrate may be improved. When there are multiple driver circuits MIC arranged in an array, the multiple driver circuits MIC may simultaneously provide driving signals to multiple device units EC connected thereto, that is, the multiple device units EC driven by different driver circuits MIC can work simultaneously. It can be understood that, in order to ensure the stability of the driver circuits MIC and prolong the service life of the driver circuits MIC, for the "drive simultaneously" and "work simultaneously" mentioned in the present disclosure, there may be a nanosecond sequence in time.

In an embodiment of the present disclosure, referring to FIG. 3, one driver circuit MIC is provided with four output pins OUTP, that is, a first output pin Out1, a second output pin Out2, a third output pin Out3 and a fourth output pin Out4 are provided. In this way, the driver circuit MIC according to the present disclosure may drive four device units EC simultaneously, which can reduce the number of the driver circuits MIC to ¼ compared to one driver circuit MIC driving one device unit EC, thus greatly reducing the cost of the array substrate.

It can be understood that, although the driver circuit MIC according to the present disclosure has slightly larger size compared to the driver circuit with only one output pin, the amount of the driver circuits MIC may be significantly reduced in the present disclosure, and thus significant improvements can be achieved in terms of reducing the overall area ratio of the driver circuit MIC, improving the bonding efficiency of the driver circuit MIC, and improving the yield of the array substrate. Exemplarily, in one embodiment of the present disclosure, the driver circuit MIC according to the present disclosure has four output pins OUTP, and the area of the driver circuit MIC is twice the area of the driver circuit MIC having only one output pin OUTP; however, the amount of the driver circuits MIC in the present disclosure may be reduced to ¼, so that the area ratio of the driver circuit MIC in the array substrate according to the present disclosure may be reduced to ½ (relative to the array substrate in which one driver circuit MIC drives one device unit EC).

Referring to FIG. 1, in any device control area column BB, the array substrate is provided with device power supply wires VLEDL and a driving data wire DataL extending along the column direction. One end of the device unit EC is electrically connected to the device power supply wire VLEDL, and the other end of the device unit EC is electrically connected to the corresponding output pin OUTP (for example, any one of Out1 to Out4). The data pin DataP is electrically connected to the driving data wire DataL.

Optionally, in any device control area column BB, the device units EC are arranged into two device unit columns, and any one of the device unit columns includes a plurality of device units EC arranged in sequence along the column direction. In any device control area column BB, the number of the device power supply wires VLEDL is two, and the two device power supply wires VLEDL are disposed in one-to-one correspondence with the two device unit columns. Each device unit EC in the two device unit columns is connected to the device power supply wire VLEDL closest to itself (that is, the device power supply wire VLEDL corresponding to the device unit EC).

Further, in an embodiment of the present disclosure, in two adjacent control area columns, two adjacent device power supply wire VLEDL may be connected to each other into one wire, that is, two adjacent device power supply wires VLEDL are combined into one device power supply wire VLEDL'. In this way, the combined device power supply wire VLEDL' may be provided corresponding to two device unit columns, and the device units EC on the two device unit columns are all connected to the combined device power supply wire VLEDL'. The width of the combined device power supply wire VLEDL' may be larger than the width of the device power supply wire VLEDL connected to the device unit column located closest to an edge of the array substrate, and the combined device power supply wire VLEDL' may include a hollow portion. Of course, the width of the combined device power supply wire VLEDL' may also be the same as the width of the device power supply wire VLEDL connected to the device unit column located closest to the edge of the array substrate.

In this embodiment, an external circuit (such as a circuit board) may provide the driving data Data to the driving data wire DataL, and then the driving data wire DataL transmits the driving data Data to the data pin DataP. The external circuit may also provide a device power supply voltage VLED to the device units EC through the device power supply wire VLEDL. Further, the driver circuit MIC includes a ground pin GNDP, and the ground pin GNDP is configured to load a ground voltage GND to the driver circuit MIC. In any device control area column BB, the array substrate is provided with a ground voltage wire GNDL extending along the column direction, and the ground pin GNDP is electrically connected to the ground voltage wire GNDL; and the external circuit may load the ground voltage wire GNDL with the ground voltage GND, and then the ground voltage GND is applied to the driver circuit MIC. In this way, the device units EC are equivalent to being connected between the device power supply wire VLEDL and the ground voltage wire GNDL. The logic control module CTR controls the turn-on or turn-off of the current path of the device units EC through the output pins OUTP, and then controls the current flowing through the device units EC and the output pins OUTP.

Optionally, in any device control area column BB, the number of device power supply wires VLEDL is two, and the two device power supply wires VLEDL are respectively located on two sides of the ground voltage wire GNDL.

Optionally, in any device control area column BB, the driver circuit MIC may be disposed overlapping the ground voltage wire GNDL to provide electromagnetic shielding for the driver circuit MIC by using the ground voltage GND loaded on the ground voltage wire GNDL.

Optionally, referring to FIG. 3, the logic control module CTR may include a control module CLM and modulation modules (for example, PWMM1 to PWMM4 in FIG. 3) that are disposed in a one-to-one correspondence with respective output pins OUTP. Each of the modulation modules is electrically connected with the corresponding output pin OUTP. The control module CLM is configured to generate driving control signals in a one-to-one correspondence with the respective modulation modules according to the driving data Data, and the driving control signals are used to control the turn-on or turn-off of the corresponding modulation module, and then control the electrical path or electrical disconnection between the output pins OUTP and the ground voltage wire GNDL, so as to realize the control of the device units EC. In some embodiments, the driving control signals may make the signals flowing through the modulation modules (and the output pins OUTP connected to the modulation modules, and the device units EC) be pulse width modulation signals by controlling the modulation modules. The driving control signals may be used to modulate the pulse width modulation signals (for example, adjusting factors such as the duty cycle of the pulse width modulation signals), thereby controlling the average current flowing through the output pins OUTP and the device units EC.

Figure 2:
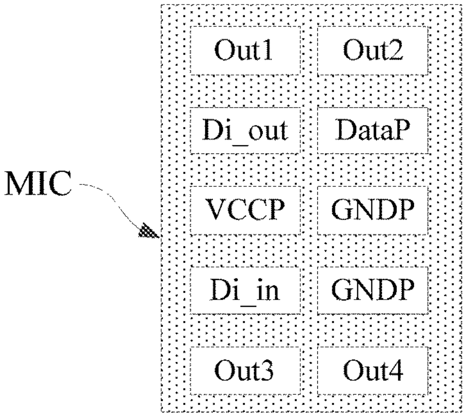
FIG. 2 is a schematic diagram of a pin arrangement of a driver circuit according to an embodiment of the present disclosure.

Exemplarily, in an embodiment of the present disclosure, referring to FIGS. 1 to 3, the driver circuit MIC includes four output pins OUTP, which are the first output pin Out1 to the fourth output pin Out4. The logic control module CTR includes four modulation modules, that is, a first modulation module PWMM1, a second modulation module PWMM2, a third modulation module PWMM3, and a fourth modulation module PWMM4. The first output pin Out1 to the fourth output pin Out4 are connected to the first modulation module PWMM1 to the fourth modulation module PWMM4 in a one-to-one correspondence. The control module CLM is configured to generate a first driving control signal, a second driving control signal, a third driving control signal, and a fourth driving control signal according to the drive data Data, and transmit the first to fourth driving control signals to the first modulation module PWMM1, the second modulation module PWMM2, the third modulation module PWMM3, and the fourth modulation module PWMM4, respectively.

The first modulation module PWMM1 is electrically connected to the first output pin Out1, and can be turned on or off under the control of the first driving control signal, causing a conductivity or disconnection between the first output pin Out1 and the ground voltage wire GNDL. When the first modulation module PWMM1 is turned on, the ground voltage wire GNDL, the first output pin Out1, the device unit EC electrically connected to the first output pin Out1, and the device power supply wire VLEDL form a signal loop, and the device unit EC works. When the first modulation module PWMM1 is turned off, the above signal loop is disconnected, and the device unit EC does not work. In this way, the first modulation module PWMM1 can modulate the current flowing through the device unit EC under the control of the first driving control signal, so that the current flowing through the device unit EC presents a pulse width modulation signal. The first modulation module PWMM1 may modulate factors such as the duty cycle of the pulse width modulation signal flowing through the device unit EC according to the first driving control signal, thereby controlling the working state of the device unit EC. When the device unit EC contains one or more LEDs, by increasing the duty cycle of the pulse width modulation signal, the total light-emitting duration of the LED(s) in a display frame may be increased, thereby increasing the total light-emitting brightness of the LED(s) in the display frame, such that the brightness of the array substrate in this region of the device unit EC may be increased. On the contrary, by reducing the duty cycle of the pulse width modulation signal, the total light-emitting duration of the LED(s) in a display frame may be reduced, thereby reducing the total light-emitting brightness of the LED(s) in the display frame, such that the brightness of the array substrate in this region may be reduced.

Correspondingly, the second modulation module PWMM2 is electrically connected to the second output pin Out2, and can be turned on or off under the control of the second driving control signal, so that the current flowing through the device unit EC connected to the second output pin Out2 presents a pulse width modulated signal. The third modulation module PWMM3 is electrically connected to the third output pin Out3, and can be turned on or off under the control of the third driving control signal, so that the current flowing through the device unit EC connected to the third output pin Out3 presents a pulse width modulated signal. The fourth modulation module PWMM4 is electrically connected to the fourth output pin Out4, and can be turned on or off under the control of the fourth driving control signal, so that the current flowing through the device unit EC connected to the fourth output pin Out4 presents a pulse width modulated signal.

In an embodiment of the present disclosure, the first modulation module PWMM1 to the fourth modulation module PWMM4 may be switching elements, for example, transistors such as metal-oxide-semiconductor field-effect transistors (MOSFETs), thin film transistors (TFTs), and the like. The first driving control signal to the fourth driving control signal may be pulse width modulation signals, and the switching elements are turned on or off under the control of the pulse width modulation signals.

Optionally, in the present disclosure, referring to FIG. 3, the first modulation module PWMM1 to the fourth modulation module PWMM4 may be electrically connected to the control module CLM through a data bus DB, or may be electrically connected to the control module through data wirings, respectively, or the electrical connection with the control module may be achieved in other ways, which is not specifically limited in the present disclosure.

In an embodiment of the present disclosure, the control module CLM may include a data link circuit and a control logic module circuit. The data link circuit is configured to electrically connect to circuits/modules or structures other than the control module CLM, for example, it is configured to electrically connect to an address pin Di_in, the data pin DataP and the data bus DB. The control logic module circuit is configured to receive external signals (for example, an address signal input from an address pin Di_in or the driving data Data input from the data pin DataP) through the data link circuit, and configured to generate driving control signals (for example, output the first driving control signal to a fifth driving control signal) and output them through the data link circuit.

In some embodiments, the driving data Data includes address information and driving information; and the logic control module CTR is further configured to obtain the driving information of the driving data Data in response to the address information of the driving data Data matching address information of the driver circuit MIC, and generate the driving control signals according to the driving information of the driving data Data.

In this way, the driving method of the driver circuit MIC may further include: in an address configuration stage, receiving an address signal, configuring address information of the driver circuit MIC according to the address signal, and generating and outputting a relay signal, where the relay signal can be used as an address signal for a succeeding driver circuit MIC. In the device control stage, the generating the driving control signals in a one-to-one correspondence with the at least two output pins OUTP according to the drive data Data may be realized by: obtaining the driving information of the driving data Data in response to the address information of the driving data Data matching the address information of the driver circuit MIC, and generating the driving control signals according to the driving information of the driving data Data.

Optionally, an external circuit (e.g., a circuit board) may be provided with an encoder, and the logic control module CTR may be provided with a decoder. The encoder may perform encoding according to the 4*b*/5*b* encoding protocol, the 8*b*/10*b* encoding protocol or other encoding protocols to generate the driving data Data and transmit the driving data Data to the driving data wiring DataL. The decoder of the logic control module CTR may decode the driving data Data, and then obtain the address information and driving information in the driving data Data.

In this way, on the array substrate, referring to FIG. 1, the data pins DataP of a plurality of driver circuits MIC may be connected to the same driving data wire DataL; the driving data wire DataL may be loaded with a plurality of different driving data Data, and each driver circuit MIC may determine the corresponding driving data Data according to the configured address information, and drive the respective connected device units EC according to the corresponding driving data Data. In the present disclosure, the driver circuit MIC may receive the driving data Data through the data pin DataP, and the array substrate may transmit the driving data Data through the driving data wire DataL, and thus the problem of too many pads and wirings caused by using a Serial Peripheral interface (SPI) for data transmission is avoided, such that the structures of the array substrate, the external circuit and the driver circuit MIC may be simplified, and the cost of the array substrate and the driver circuit MIC is reduced. In an embodiment of the present disclosure, referring to FIG. 1, one column of driver circuits MIC and one driving data wire DataL are provided in one device control area column BB, and the data pin DataP of each driver circuit MIC is connected to the driving data wiring DataL.

Optionally, in the present disclosure, the address information may be pre-configured in the driver circuit MIC, or the address information may be configured after the driver circuit MIC is powered on. In an embodiment of the present disclosure, after power-on, the address information may be allocated to each driver circuit MIC, and the address information may be a dynamic address.

Exemplarily, referring to FIGS. 1 and 3, the driver circuit MIC may further include an address pin Di_in and a relay pin Di_out. The address pin Di_in is capable of receiving an address signal, and the logic control module CTR is further configured to configure the address information of the driver circuit MIC according to the address signal, and generate a relay signal, where the relay signal can be used as an address signal for a succeeding driver circuit MIC. The relay pin Di_out is configured to output the relay signal. In the present disclosure, when the driver circuits MIC are cascaded, the next-stage driver circuit MIC of the current-stage driver circuit MIC is the succeeding driver circuit MIC of the current-stage driver circuit MIC. In this way, when a plurality of driver circuits MIC on the array substrate are cascaded in sequence, the driver circuit MIC of the current stage may configure the address information for the driver circuit MIC of the next stage according to its own address information, so as to realize the allocation of the dynamic addresses to the cascaded driver circuits MIC.

In an embodiment of the present disclosure, the address information may be a digital signal, which may be modulated into the address signal. After one driver circuit MIC receives the address signal, it may parse, obtain and store the address information in the address signal, and may also increment the address information by 1 or another fixed amount and modulate the incremented address information (new address information) into the relay signal. The relay signal is used as the address signal of the next-stage driver circuit MIC. Of course, the driver circuit MIC may also use other different functions to generate new address information.

In an embodiment of the present disclosure, referring to FIG. 3, the logic control module CTR may further include a fifth modulation module PWMM5, and the fifth modulation module PWMM5 is electrically connected to the relay pin Di_out. The control module CLM may receive the address signal from the address pin Di_in, and generate and transmit a relay control signal to the fifth modulation module PWMM5 according to the address signal. Accordingly, in response to the relay control signal, the fifth modulation module PWMM5 may generate the relay signal and load the relay signal to the relay pin Di_out.

In the present disclosure, the fifth modulation module PWMM5 may be electrically connected to the control module CLM through the data bus DB, may also be electrically connected to the control module through a dedicated data wire, or may also be electrically connected to the control module in other ways, which is not specifically limited in the disclosure.

Exemplarily, referring to FIG. 3, in an embodiment of the present disclosure, the driver circuit MIC further includes a data bus DB. The first modulation module PWMM1 to the fifth modulation module PWMM5, and the control module CLM are all connected to the data bus DB, such that the control module CLM is interact with the first modulation module PWMM1 to the fifth modulation module PWMM5.

In one embodiment of the present disclosure, the fifth modulation module PWMM5 may include switching elements, for example, transistors such as metal-oxide-semiconductor field-effect transistors (MOSFETs), thin film transistors (TFTs), and the like. The relay control signal may be a pulse width modulation signal, and the switching elements are turned on or off under the control of the pulse width modulation signal. When the switching elements are turned on, the fifth modulation module PWMM5 may output current or voltage. When the switching elements are turned off, the fifth modulation module PWMM5 may not output current or voltage. In this way, the fifth modulation module PWMM5 may modulate one pulse width modulation signal as the relay signal.

Optionally, referring to FIG. 1, the driver circuits MIC located in the same device control area column BB are cascaded in sequence. In any device control area column BB, the array substrate is provided with a plurality of address wires ADDRL in a one-to-one correspondence with respective driver circuits MIC, and each of the address wires ADDRL extends along the column direction. The address pin Di_in of the driver circuit MIC is electrically connected to the corresponding address wire ADDRL, and the relay pin Di_out of the current-stage driver circuit MIC is electrically connected to an address wire corresponding to the next-stage driver circuit MIC of the current-stage driver circuit. In this way, in the device control area column BB, the cascaded driver circuits MIC may be electrically connected through the address wires ADDRL, and the relay signal of the driver circuit MIC of the current stage may be loaded to the address wire ADDRL corresponding to the driver circuit MIC of the next stage, and used as the address signal of the next-stage driver circuit MIC. Further, the external circuit may load the address signal to the address wire ADDRL corresponding to the first-stage driver circuit MIC.

Referring to FIG. 1, according to an embodiment of the present disclosure, in any one device control area column BB, each address wire ADDRL extends in the same direction. In other words, the extension lines of the respective address wires ADDRL may overlap. In this way, in the row direction, the address wires ADDRL may have the width of only one address wire ADDRL, which avoids the address wire ADDRL occupying too much wiring space in the row direction, thereby helping to increase the widths of wires such as the device power supply wire VLEDL and the ground voltage wire GNDL to reduce the square resistance of these wires.

Referring to FIG. 1, according to an embodiment of the present disclosure, in any one device control area column BB, each address wire ADDRL is located between the device power supply wire VLEDL and the ground voltage wire GNDL.

According to an embodiment of the present disclosure, referring to FIG. 1, in at least one device control area column BB, the array substrate is further provided with a feedback wire FBL. In a plurality of driver circuits MIC cascaded in sequence, the relay pin Di_out of the driver circuit MIC at the last stage may be connected to the feedback wire FBL.

Further, the array substrate may include a plurality of signal channels, and each signal channel includes one device control area column BB or a plurality of sequentially adjacent device control area columns BB. In one signal channel, the driver circuits MIC are cascaded in sequence. In any signal channel, the array substrate may be provided with at least one feedback wire FBL, such that the relay pin Di_out of the last-stage driver circuit MIC in the signal channel is electrically connected to the feedback wire FBL. Exemplarily, referring to FIG. 1, one signal channel includes one device control area column BB. For another example, referring to FIG. 1, any one of the device control area columns BB is provided with a feedback wire FBL. Optionally, in the device control area column BB, the feedback wire FBL is located between the ground voltage wire GNDL and the device power supply wire VLEDL closest to the feedback wire FBL.

Optionally, referring to FIGS. 1 and 3, the driver circuit MIC further includes a chip power supply pin VCCP. The chip power supply pin VCCP is configured to load a chip power supply voltage VCC to the driver circuit MIC for driving the operation of the driver circuit MIC. Further, the driver circuit MIC may further include a power supply module PWRM. The chip power supply pin VCCP may load the chip power supply voltage VCC to the power supply module PWRM, and the power supply module is configured to distribute power to various circuits of the driver circuit MIC to ensure power supply of the driver circuit MIC.

Referring to FIG. 1, in the device control area column BB, the array substrate may be provided with a chip power supply wire VCCL extending in the column direction, and an external circuit may load the chip power supply voltage VCC to the driver circuit MIC through the chip power supply wire VCCL. Further, referring to FIG. 1, the chip power supply wire VCCL is located between the device power supply wire VLEDL closest to the chip power supply wire VCCL and the ground voltage wire GNDL.

In this embodiment, the array substrate uses different wires to load the chip power supply voltage VCC and the driving data Data respectively, which can simplify the circuit structure inside the driver circuit, and it is not necessary to provide a power adjustment circuit in the driver circuit (the power adjustment circuit is used to generate the chip power supply voltage based on the DC component in the power supply signal and generate the driving data based on the modulation component in the power supply signal), and thus the area of the driver circuit is reduced. In addition, this arrangement method may also simplify the external circuit structure, avoid setting up a modulation circuit that modulates the chip power supply voltage and driving data into power line carrier communication, and may also reduce the quality requirements for the chip power supply voltage. Therefore, the arrangement method of the driver circuit and the array substrate according to the present disclosure can simplify the structure and reduce the cost of the driver circuit and the external circuit. Furthermore, the array substrate uses different wires to load the chip power supply voltage VCC and the driving data Data respectively, which can also ensure the signal quality of the chip power supply voltage VCC and the driving data Data, thereby helping to improve the stability of the array substrate and the accuracy of local dimming.

Of course, in other embodiments of the present disclosure, the data pin DataP and the chip power supply pin VCCP of the driver circuit MIC may also be combined into one power supply pin. The array substrate may be provided with a power supply wire, and the power supply pin is electrically connected with the power supply wire. An external circuit (such as a circuit board) can modulate the chip power supply voltage VCC and the driving data Data into a power line carrier communication signal, and transmit it to the power supply wire. The power supply wire transmits the power line carrier communication signal to the driver circuit MIC. The driver circuit MIC is configured to generate the chip power supply voltage VCC and the driving data Data according to the power line carrier communication signal, and to generate driving control signals in a one-to-one correspondence with respective output pins according to the driving data. Further, the driver circuit is provided with a power conditioning circuit, which is configured to generate the chip power supply voltage VCC based on the DC component in the power line carrier communication signal, and generate the drive data Data based on the modulation component in the power line carrier communication signal PWR.

Figure 4:
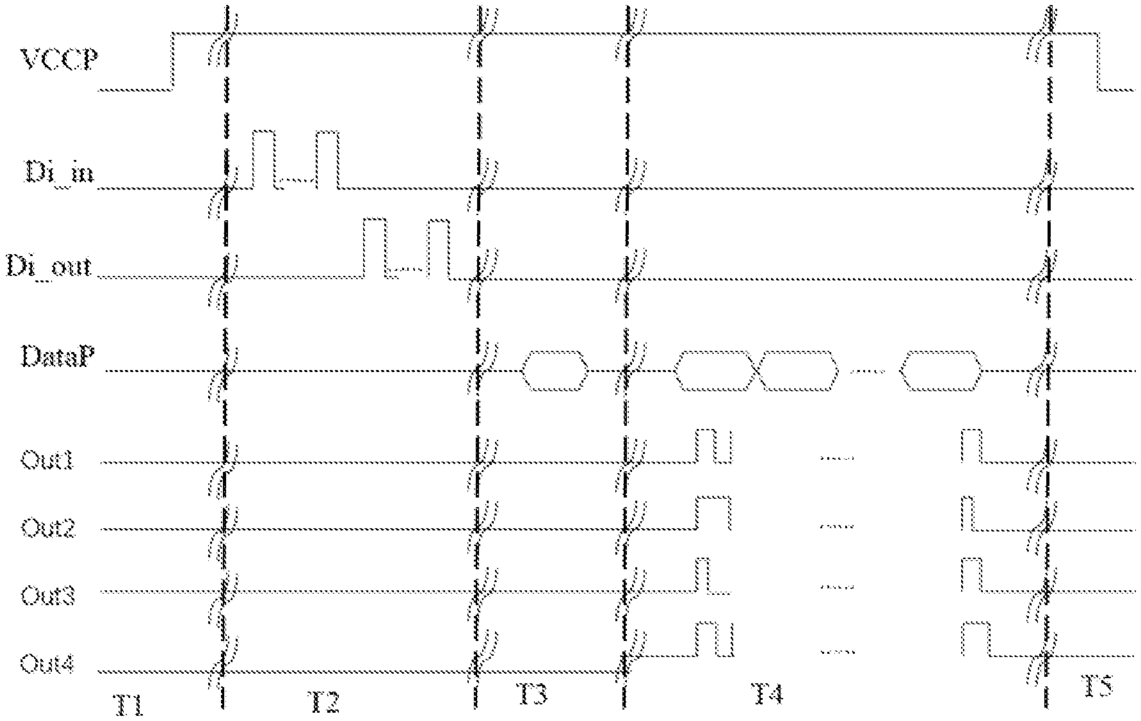
FIG. 4 is a timing schematic diagram of a driver circuit according to an embodiment of the present disclosure.
Figure 5:
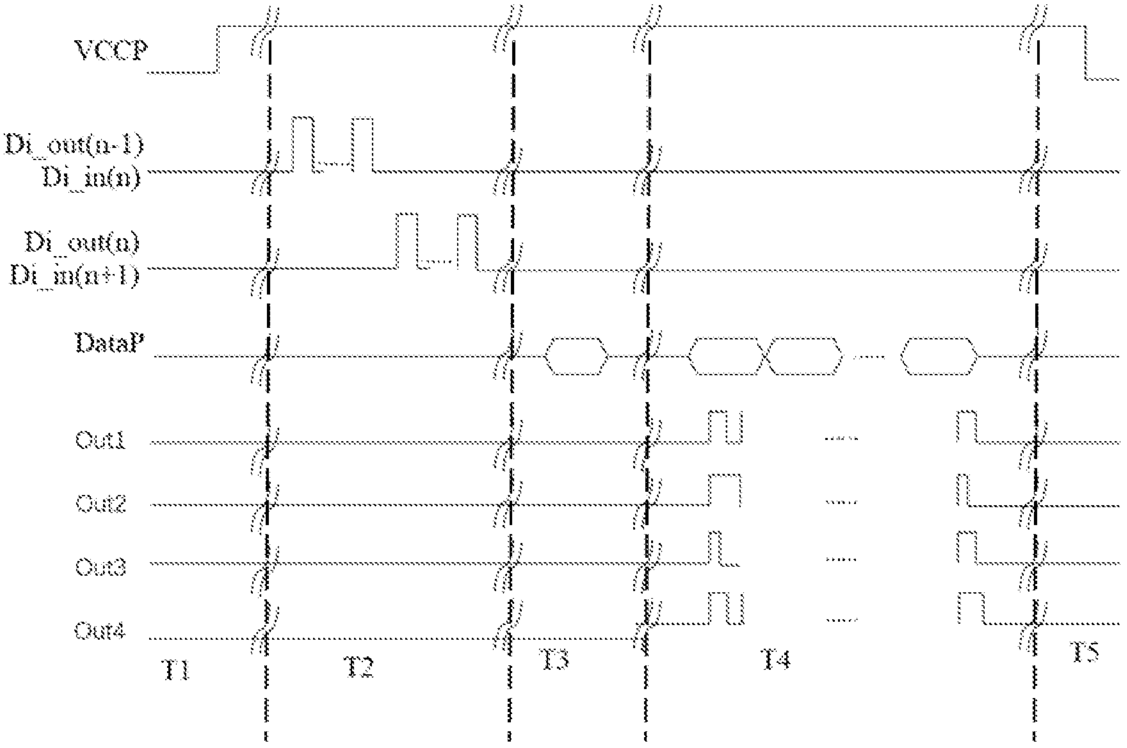
FIG. 5 is a timing schematic diagram of cascaded driver circuits according to an embodiment of the present disclosure.
Figure 6:
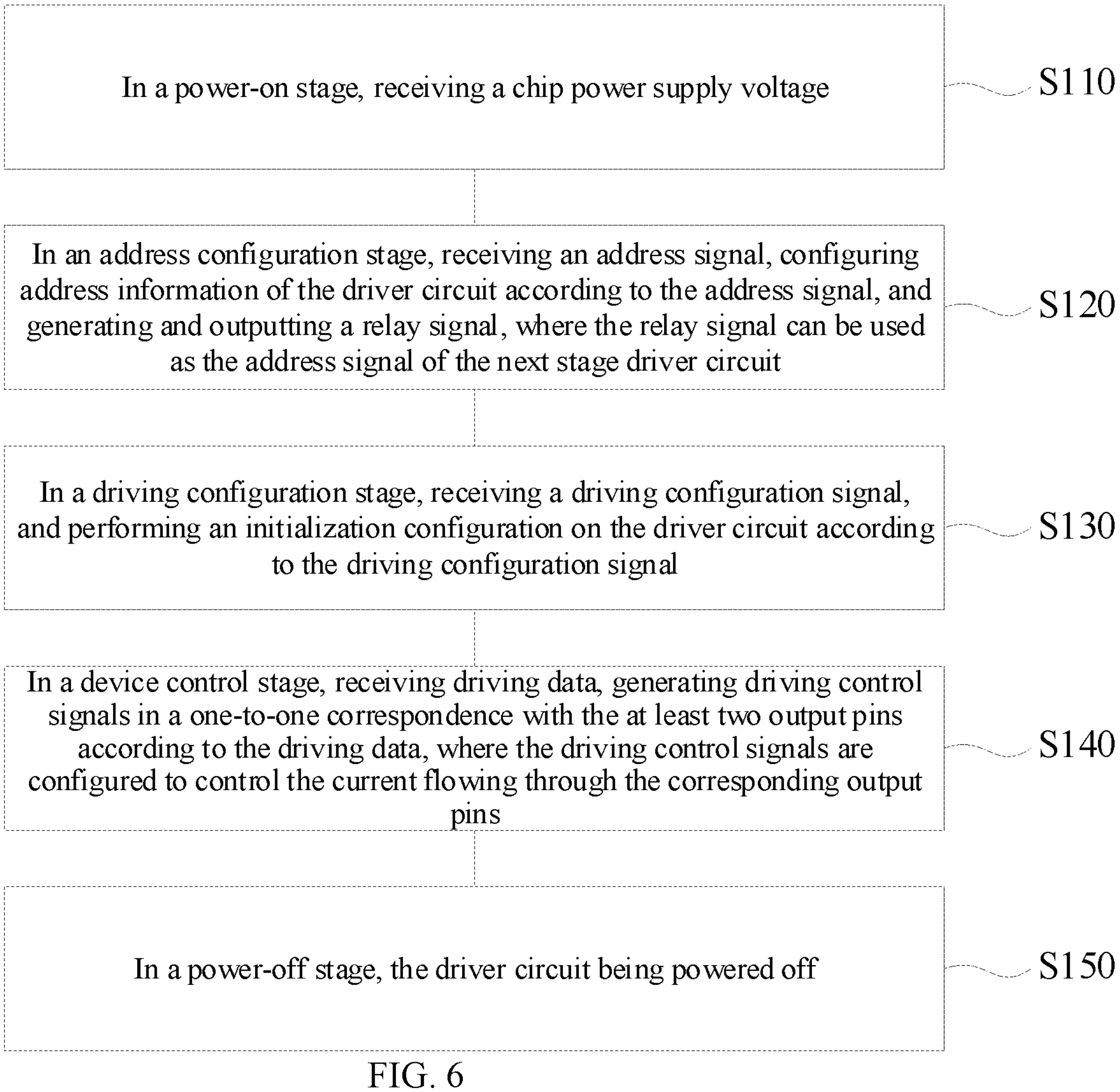
FIG. 6 is a flowchart of a driving method of a driver circuit according to an embodiment of the present disclosure.

In an exemplary embodiment, referring to FIGS. 2 and 3, the driver circuit MIC includes at least two output pins OUTP, a data pin DataP, an address pin Di_in, a relay pin Di_out, ground pins GNDP and a chip power supply pin VCCP. Referring to FIGS. 4 to 6, the driver circuit MIC may drive the connected device units EC and then drive the array substrate through the driving method shown in the following steps S110 to S140.

In step S110, in a power-on stage T1, a chip power supply voltage VCC is received. In this step, the external circuit may load the chip power supply voltage VCC to the chip power supply wire VCCL, and the chip power supply voltage VCC may be loaded to the driver circuit MIC through the chip power supply pin VCCP to supply power to the driver circuit MIC. In this way, the driver circuit MIC is in a powered-on state.

Optionally, when the display device according to the present disclosure is in operation, the external circuit may simultaneously load the chip power supply voltage VCC to each chip power supply wire VCCL, thereby enabling each driver circuit MIC of the array substrate to be powered on at the same time.

Optionally, when the display device is powered on and the external circuit (such as a circuit board that drives the array substrate) is powered on, the external circuit may load the chip power supply voltage VCC to the chip power supply wire VCCL, so that the power-on of the driver circuit MIC and the power-on of the display device are synchronized.

In step S120, in an address configuration stage T2, an address signal is received, address information of the driver circuit MIC is configured according to the address signal, and a relay signal is generated and output. The relay signal may be used as the address signal of the next-stage driver circuit MIC (that is, the succeeding driver circuit MIC). The driver circuit MIC may receive the address signal on the connected address wire ADDRL through the address pin Di_in. When the address wire ADDRL is electrically connected to the external circuit, the address signal may be the address signal loaded by the external circuit to the address wire ADDRL. When the address wire ADDRL is electrically connected to the previous-stage driver circuit MIC, the address signal on the address wire ADDRL may be the relay signal output by the previous-stage driver circuit MIC. The relay signal may be output from the driver circuit MIC through the relay pin Di_out.

Exemplarily, referring to FIG. 5, in the cascaded driver circuits MIC, Di_out(n−1) is the relay pin Di_out of the $(n-1)^{th}$ stage driver circuit MIC; Di_in(n) is the address pin Di_in of the $n^{th}$ stage driver circuit MIC; Di_out(n) is the relay pin Di_out of the $n^{th}$ stage driver circuit MIC; and Di_in(n+1) is the address pin Di_in of the $(n+1)^{th}$ stage driver circuit MIC. Referring to FIG. 5, in the address configuration stage T2, Di_out(n−1) and Di_in(n) are loaded with the same signal, that is, the relay signal output by the $(n-1)^{th}$ stage driver circuit MIC is used as the address signal of the $n^{th}$ stage driver circuit MIC; and Di_out(n) and Di_in(n+1) are loaded with the same signal, that is, the relay signal output by the $n^{th}$ stage driver circuit MIC is used as the address signal of the $(n+1)^{th}$ stage driver circuit MIC. In this example, 2≤n≤N−1, where n is a positive integer, and N is the total number of the plurality of driver circuits MIC in a cascade relationship.

In step S120, in the plurality of driver circuits MIC cascaded in sequence, the external circuit may load the address signal to the first stage driver circuit MIC, so that the address information is configured to the first stage driver circuit MIC; and then the current-stage driver circuit MIC outputs the relay signal as the address signal to its next-stage driver circuit MIC, so that the address information is configured to its next-stage driver circuit MIC until the last driver circuit MIC is configured, thereby realizing the configuration of address information for each driver circuit MIC.

Step S130, in a driving configuration stage T3, a driving configuration signal is received, and an initialization configuration is performed on the driver circuit MIC according to the driving configuration signal. The external circuit may load the driving configuration signal to the driving data wire DataL, and then the driving configuration signal may be loaded to the driver circuit MIC through the data pin DataP.

Optionally, the driver circuits MIC connected to the same driving data wire DataL may simultaneously receive the driving configuration signal and perform the initial configuration.

Optionally, the external circuit may simultaneously load the driving configuration signal to each driving data wire DataL, so that each driver circuit MIC may receive the driving configuration signal and complete the initialization configuration at the same time, thereby reducing the time for the array substrate to perform the initialization configuration for the driver circuit MIC.

In step S140, in a device control stage T4, driving data Data is received, and driving control signals in a one-to-one correspondence with the at least two output pins OUTP are generated according to the driving data Data, where the driving control signals are configured to control the current flowing through the corresponding output pins OUTP. In this way, under the action of the device power supply voltage VLED loaded on the device power supply wire VLEDL, the driver circuit MIC may control the current flowing through the device units EC to achieve the purpose of driving each connected device unit EC according to the driving data Data. In step S140, the external circuit may load the driving data Data to the driving data wire DataL, and then the driving data Data is received by the driver circuit MIC through the data pin DataP.

In an embodiment of the present disclosure, the driving data Data includes address information and driving information. In response to the address information of the driving data Data matching address information of the driver circuit MIC, the driving information of the driving data Data is obtained, and the driving control signals are generated according to the driving information of the driving data Data.

Optionally, the driving method of the driver circuit MIC may further include step S150. In a power-off stage T5, the driver circuit MIC is in a power-off state and does not work. Optionally, the chip power supply voltage VCC may no longer be applied to the chip power supply wire VCCL, such that the driver circuit MIC is in a power-off state. Optionally, when the external circuit for driving the array substrate is powered off, the driver circuit MIC is powered off. In other words, when the display device is powered off, the driver circuit MIC can be powered off and is in a power-off state.

Figure 7:
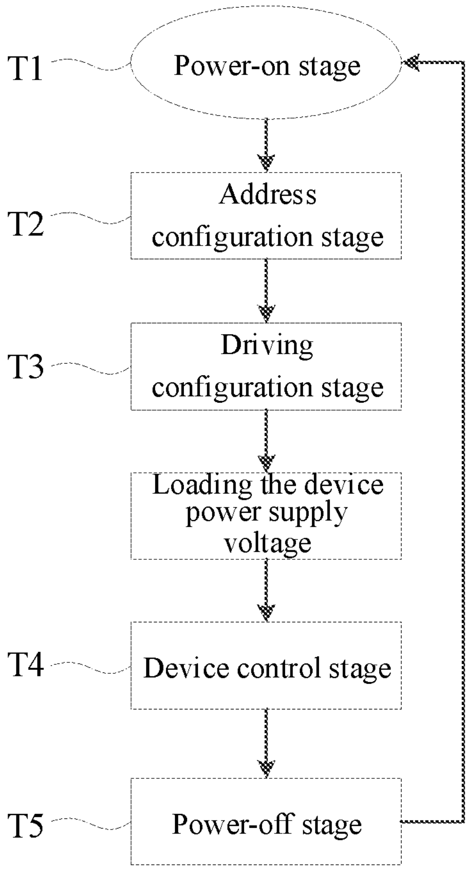
FIG. 7 is a schematic diagram of a driving process of an array substrate according to an embodiment of the present disclosure.

Optionally, FIG. 7 is a schematic diagram of the driving process of the array substrate. Referring to FIG. 7, when the array substrate is in operation, it may further include, before the device control stage T4, loading the device power supply voltage VLED to the device power supply wire VLEDL. In this way, the device unit EC may work under the control of the driver circuit MIC, for example, the light-emitting element may emit light under the control of the driver circuit MIC.

In some embodiments of the present disclosure, the number of output pins OUTP is four, and the driver circuit MIC further includes a data pin DataP, an address pin Di_in, a relay pin Di_out, a ground pin GNDP, and a chip power supply pin VCCP. In this way, in the device control area column BB, the array substrate may be provided with the driving data wire DataL electrically connected to the data pin DataP, the address wire ADDRL electrically connected to the address pin Di_in or the relay pin Di_out, the ground voltage wire GNDL electrically connected to the ground pin GNDP, the chip power supply wire VCCL electrically connected to the chip power supply pin VCCP, and the device power supply wire VLEDL for loading the device power supply voltage VLED to the device unit EC.

In this embodiment, the pins of the driver circuit MIC may be arranged in multiple columns, so as to facilitate the preparation of the driver circuit MIC. For example, the pins of the driver circuit MIC may be arranged in three columns (three pins per column) or in two columns.

In one embodiment of the present disclosure, the pins (for example, including the ground pin GNDP, the chip power supply pin VCCP, the data pin DataP, the address pin Di_in, the relay pin Di_out, the output pin OUTP, and the like) of the driver circuit MIC are arranged in two pin columns, and each of the pin columns includes a plurality of pins arranged in a straight line. Further, at least one of the pin columns includes five pins, in other words, one of the pin columns may include five pins, and the other pin columns may include the remaining pins. In this case, four output pins OUTP are all located at ends of the pin columns, so that the four output pins OUTP are electrically connected to the four device units EC respectively.

Optionally, the driver circuit MIC has two ground pins GNDP. In this way, the driver circuit MIC includes ten pins, and each pin column includes five pins, which facilitates the uniformity of the various pins and facilitates the preparation of the driver circuit MIC. Further, the two ground pins GNDP are located in the same pin column to facilitate wiring. Further, two ground pins GNDP are arranged adjacently. It can be understood that the driver circuit MIC may also have only one ground pin GNDP, and therefore the driver circuit MIC has nine pins. Further, the pin column with the ground pin GNDP has four pins.

Optionally, the chip power supply pin VCCP and the data pin DataP are in different pin columns. In this way, the chip power supply wire VCCL and the driving data wire DataL may be located on two sides of the ground voltage wire GNDL, respectively. Of course, the chip power supply pin VCCP and the data pin DataP may also be located in the same pin column. In this way, the chip power supply wire VCCL and the driving data wire DataL may be located on the same side of the ground voltage wire GNDL.

Optionally, the address pin Di_in and the relay pin Di_out are in the same pin column. In this way, when both the relay pin Di_out of the previous-stage driver circuit MIC and the address pin Di_in of the next-stage driver circuit MIC are connected to the same address wire ADDRL, the wiring of the array substrate is simpler and more convenient, the overlapping area between the wires can be reduced, and the yield of the array substrate can be improved.

Exemplarily, in an embodiment of the present disclosure, referring to FIG. 2, one pin column may include an address pin Di_in, a chip power supply pin VCCP, and a relay pin Di_out arranged in sequence; and the other pin column may include a data pin DataP and ground pins GNDP. It can be understood that this example shows only one way of the pin arrangement of the driver circuit MIC, and the pins of the driver circuit MIC may also be arranged in other ways, for example, the address pin Di_in, the data pin DataP and the relay pin Di_out are disposed in one pin column, and the chip power supply pin VCCP and the ground pins GNDP are disposed in the other pin column.

Optionally, a distance between a pin of the driver circuit MIC and an edge of the driver circuit MIC closest to the pin may range from 25 to 40 microns to facilitate the preparation of the driver circuit and avoid increasing the area of the driver circuit due to a large distance.

In the present disclosure, an arrangement direction of the pins in the pin column may be defined as a first direction, and an arrangement direction of the two pin columns may be defined as a second direction. Optionally, in the same pin column, a distance between two adjacent pins may be 0.8 to 1.2 times the size of one of the two adjacent pins in the first direction. In this way, on the one hand, the process window of the bonding between the pins and the chip pads may be enlarged, and the poor bonding caused by the alignment deviation may be reduced; on the other hand, it is avoided that the distance between the two pins is too large to increase the area of the driver circuit, thereby reducing the area of the driver circuit to reduce the cost of the array substrate. Exemplarily, the size of the pin of the driver circuit in the first direction may be in a range of 80-120 microns, and the distance between two adjacent pins in the first direction may be in a range of 80-100 microns.

Optionally, the distance between two adjacent pin columns may be 0.8 to 1.2 times the size of the pin in the second direction. In this way, on the one hand, the process window of the bonding between the pins and the chip pads may be enlarged, and the poor bonding caused by the alignment deviation may be reduced; on the other hand, it is avoided that the distance between the two pins is too large to increase the area of the driver circuit, thereby reducing the area of the driver circuit to reduce the cost of the array substrate. Exemplarily, the size of the pin of the driver circuit in the second direction may be in a range of 120-150 microns, and the distance between two adjacent pins in the second direction may be in a range of 130-170 microns.

Figure 12:
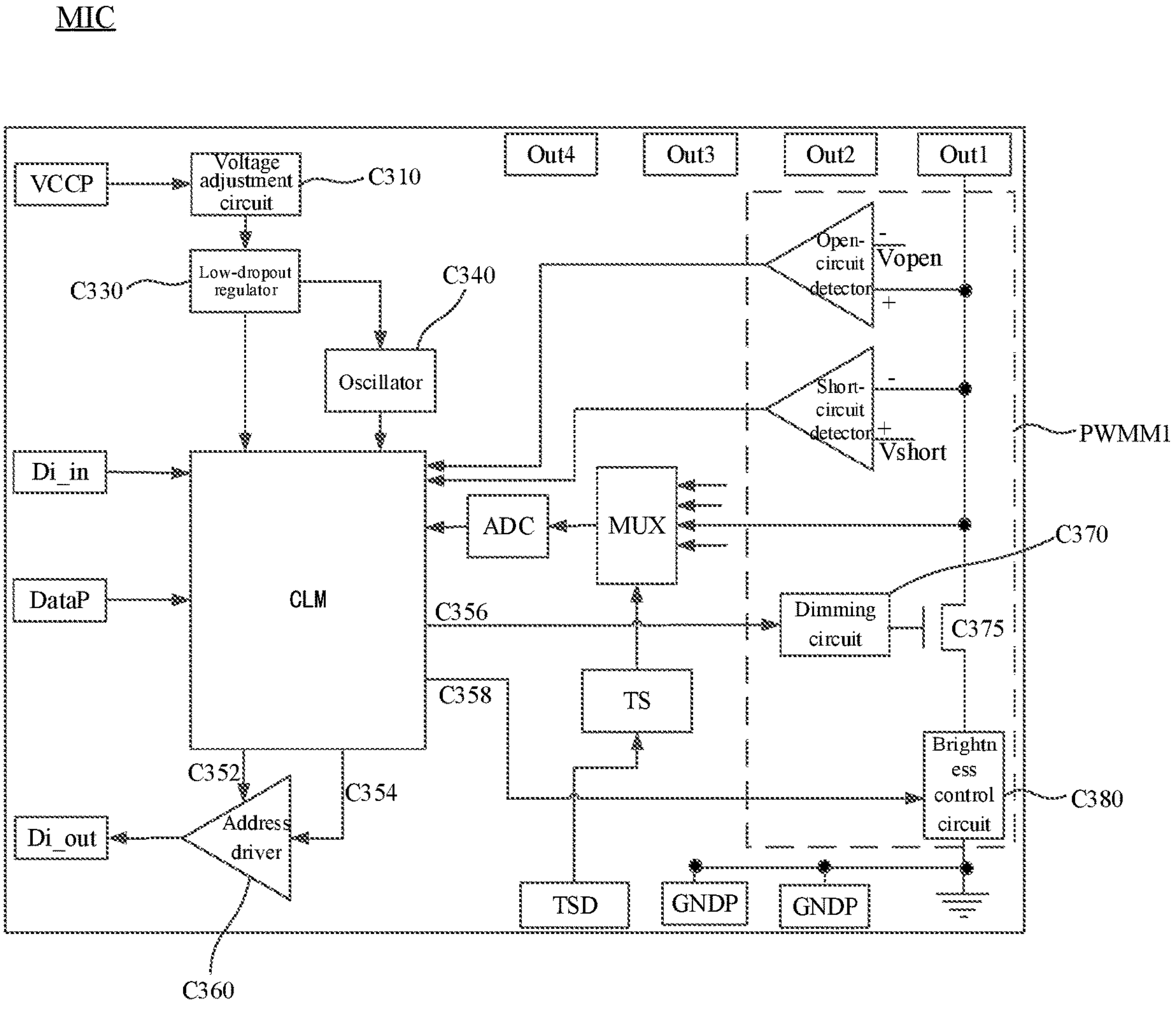
FIG. 12 is a schematic diagram of a driver circuit according to an embodiment of the present disclosure.

FIG. 12 shows an example of a driver circuit MIC according to the present disclosure. This example shows only the first modulation module PWMM1 and no other modulation modules are shown. Referring to FIG. 12, in this example, the driver circuit MIC may include a voltage adjustment circuit C310, a low-dropout regulator C330, an oscillator C340, a control logic module CLM, an address driver C360, a dimming circuit C370, a transistor C375, and a brightness control circuit C380. In various implementations, the driver circuit MIC may include additional, fewer, or different components.

The voltage adjustment circuit C310 adjusts the chip power supply voltage VCC received at the chip power supply pin VCCP to obtain a DC component in the chip power supply voltage VCC and to generate a power supply voltage. In an exemplary embodiment, the voltage adjustment circuit C310 includes a first-order RC filter followed by an active follower. The power supply voltage is provided to the low-dropout regulator C330, and the low-dropout regulator C330 converts the power supply voltage to a regulated DC voltage (which can be gradually reduced) for powering the oscillator C340, the control logic module CLM and other components (not shown). In an exemplary embodiment, the regulated DC voltage may be 1.8 volts. The oscillator C340 provides a clock signal, and the maximum frequency of the clock signal may be, for example, about 10 MHz.

The control logic module CLM receives the driving data Data from the data pin DataP, the DC voltage from the low-dropout regulator C330 and the clock signal from the oscillator C340. Depending on the working stage of the array substrate, the control logic module CLM may also receive digital data from the address signal received at the address pin Di_in; and the control logic module CLM may output an enable signal C352, an incremental data signal C354, a PWM clock selection signal C356 and a maximum current signal C358. At the address configuration stage, the control logic module CLM activates the enable signal C352 to enable the address driver C360. The control logic module CLM receives the address signal via the address pin Di_in, stores the address, and provides the incremented data signal C354 representing the outgoing address to the address driver C360. When the enable signal C352 is activated in the address configuration stage, the address driver C360 buffers the incremented data signal C354 to the relay pin Di_out. The control logic module CLM may control the dimming circuit C370 to turn off the transistor C375 at the address configuration stage, so as to effectively block the current path from the device unit.

During the device control stage and the drive configuration stage, the control logic module CLM deactivates the enable signal C352 and the output of the address driver C360 is tri-stated to effectively decouple the address driver C360 from the relay pin Di_out. During the device control stage, the PWM clock selection signal C356 specifies the duty cycle used to control the PWM dimming by the PWM dimming circuit C370. Based on the selected duty cycle, the PWM dimming circuit C370 controls the timing of the on and off states of the transistor C375. During the on-state of the transistor C375, a current path is established through the transistor C375 from the output pin OUTP (coupled to the device unit, exemplified by Out1 in FIG. 12) to the ground pin GNDP, and the brightness control circuit C380 collects the driver current flowing through the functional elements of the device unit. During the off state of the transistor C375, the current path is interrupted to prevent the current from flowing through the device unit. When the transistor C375 is the on-state, the brightness control circuit C380 receives the maximum current signal C358 from the control logic module CLM and controls the level of current flowing through the functional elements (from the output pin OUTP to the ground pin GNDP). During the device control stage, the control logic module CLM controls the duty cycle of the PWM dimming circuit C370 and the maximum current C358 of the brightness control circuit C380 to set the LEDs in the device unit to the desired brightness.

It can be understood that the driver circuit MIC may also include a voltage-controlled constant-current circuit (not shown). The input reference voltage and input reference current of the voltage-controlled constant-current circuit may be generated by the chip power supply voltage VCC received at the chip power supply pin VCCP. The voltage-controlled constant-current circuit may be electrically connected to the brightness control circuit C380.

Referring to FIG. 12, a short-circuit detector and an open-circuit detector are provided in the modulation module. The open-circuit detector is composed of an operational amplifier connected in a virtual open manner to detect whether an open circuit occurs between the device unit and the driver circuit MIC, where the Vopen end may be a floating signal end. The short-circuit detector is composed of an operational amplifier connected in a virtual short manner to detect whether a short circuit occurs between the device unit and the driver circuit MIC, where the potential of the Vshort end may be the same as the potential of the power supply voltage VLED transmitted by the device power supply wire VLEDL.

In any signal channel, information such as the short circuit and the open circuit between various device units and the driver circuit MIC may be collected into the control logic module CLM of the corresponding driver circuit MIC, and then transmitted step by step through the relay pin Di_out of the driver circuit MIC (for example, the information is sequentially appended to the data signal C354 according to the coding rules), until it is output by the relay pin Di_out of the driver circuit MIC of the last stage, and is connected to the external circuit through the feedback wire FBL. The external circuit may respond to the feedback information to detect the abnormality of the driver circuit MIC or the device unit EC in time.

In some embodiments, during the power-on state and/or the address configuration state, the cyclic redundancy check (CRC) check information in the signal channel may also be output by the relay pin Di_out of the driver circuit MIC of the last stage, and is connected to the external circuit through the feedback wire FBL in the same way. The external circuit may respond to the feedback information to detect the abnormality of the driver circuit MIC or the device unit EC in time.

In some embodiments, as shown in FIG. 12, the driver circuit MIC further includes a data selector MUX and an analog-to-digital converter ADC. When the driver circuit MIC forms a signal loop with the corresponding connected device unit EC and the device power supply wire VLEDL through the plurality of output pins OutP, a plurality of electrical signals of the signal loop may be transmitted to the data selector MUX and transmitted to the control logic module CLM after processing in time sequence by the analog-to-digital converter ADC, and then transmitted step by step through the relay pin Di_out of the driver circuit MIC (for example, the plurality of electrical signals of the signal loop are sequentially appended to the data signal C354 according to the coding rules), until it is output by the relay pin Di_out of the driver circuit MIC of the last stage, and is connected to the external circuit through the feedback wire FBL. The external circuit may respond to the feedback information to adjust the output signal level (for example, the level of the device power supply voltage VLED), thereby reducing the power consumption of the array substrate.

Referring to FIG. 12, the driver circuit MIC may further be provided with a thermal shutdown delay sensor TSD and a thermal shutdown delay controller TS. The thermal shutdown delay sensor TSD is configured to detect the internal temperature of the driver circuit MIC. When the internal temperature of the driver circuit MIC reaches a preset protection temperature (generally set between 150° C.-170° C.), the thermal shutdown delay controller TS works to turn off the output of the driver circuit MIC and reduce the power consumption of the driver circuit MIC, thereby reducing the internal temperature of the driver circuit MIC. When the internal temperature of the driver circuit MIC drops to a preset restart temperature (the restart temperature=the protection temperature−a delay temperature), the driver circuit MIC may output again. The delay temperature is generally set in a range of 15~30°. The thermal shutdown delay controller TS may be connected with the data selector MUX, and may feedback the abnormal information to the control logic module CLM through the data selector MUX to control the working state of the driver circuit MIC.

Figure 13:
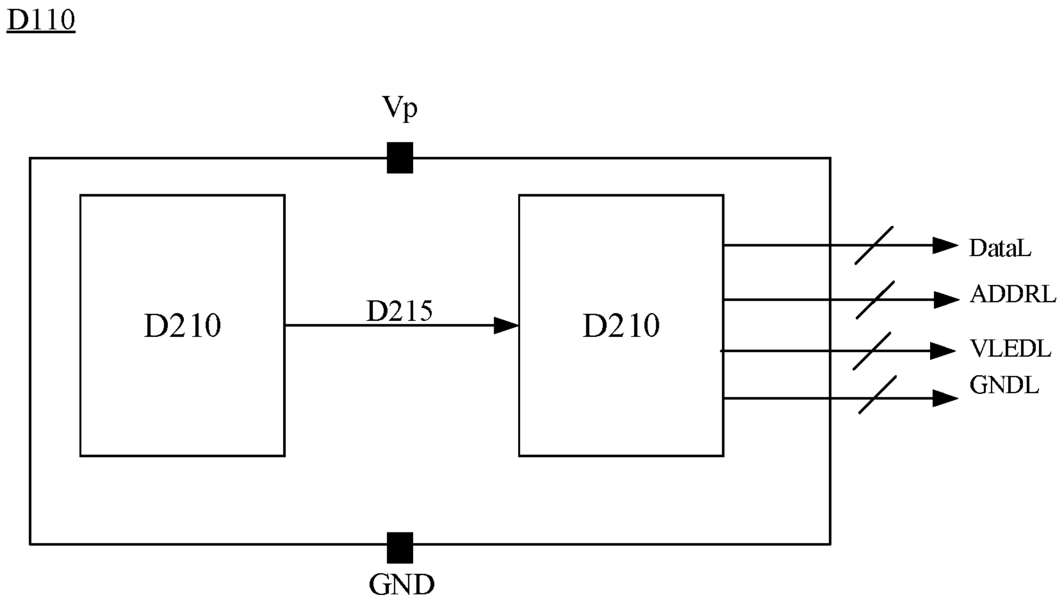
FIG. 13 is a schematic diagram of a control circuit according to an embodiment of the present disclosure.

In some embodiments, in the display device, the external circuit may further include a control circuit D110 for driving the array substrate. Referring to FIG. 13, the control circuit D110 generates the address signal ADDR and the driving data Data for controlling the array substrate, and provides these signals to the driver circuit MIC via driving wires (VLEDL/ADDRL/GNDL/DataL, etc.). The control circuit D110 may include a timing controller D210 and a bridge D220. In various embodiments, the control circuit D110 may include additional, fewer, or different components. For example, in some embodiments, the control circuit D110 may be implemented using a field programmable gate array (FPGA) and/or a PHY block. The control circuit D110 is powered by an input voltage (VP) and is connected to the ground (GND). The control circuit D110 may control the display device using an active matrix (AM) driving method or a passive matrix (PM) driving method.

The timing controller D210 generates an image control signal D215 indicating values for driving the pixels of the array substrate and timing for driving the pixels. For example, the timing controller D210 controls the timing of the image frame or video frame, and controls the timing of driving each of the device units (for example, LEDs in a LED light region) in the image frame or video frame. In addition, the timing controller D210 controls the brightness used to drive each of the LED light regions during a given image frame or video frame. The image control signal D215 is provided by the timing controller D210 to the bridge D220.

The bridge D220 converts the image control signal D215 into the address signal ADDR and the driver control signal of the driving data Data. For example, the bridge D220 may generate the address signal ADDR for the first driver circuit MIC in a group of driver circuits MIC during the addressing mode according to the control scheme described above.

Figure 10:
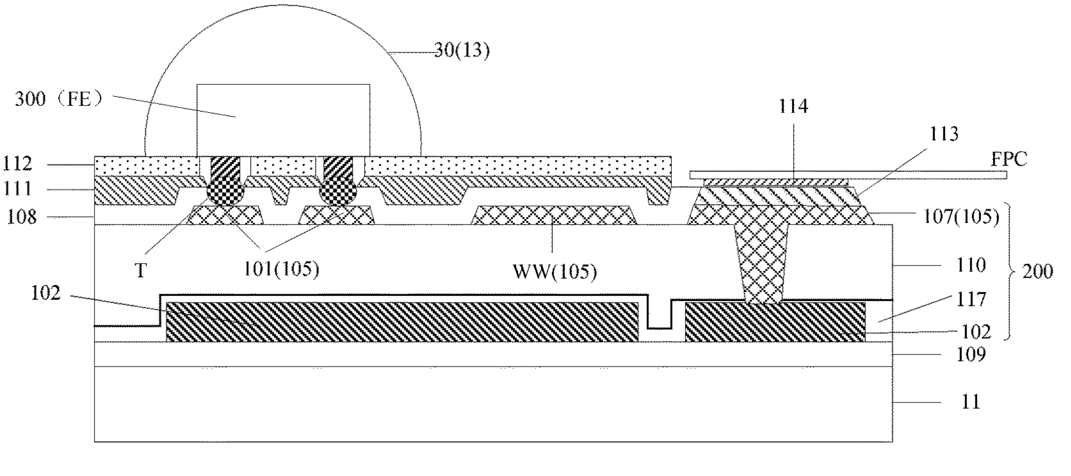
FIG. 10 is a schematic structural diagram of an array substrate according to an embodiment of the present disclosure.

From the perspective of a film layer structure, referring to FIG. 10, the array substrate may include a base substrate 11, a driving circuit layer 200 and a device layer 300 stacked in sequence. The driving circuit layer may be provided with bonding pads, such as device pads for bonding functional elements, chip pads for bonding the driver circuit MIC, and circuit board pads for bonding external circuits, and the like. The device layer includes various functional elements bonded and connected to the device pads and various driver circuits MIC bonded and connected to the chip pads. In the present disclosure, the chip pads bonded and connected to respective pins of the same driver circuit MIC may form a chip pad group. In this way, the driving circuit layer of the array substrate may include a plurality of chip pad groups, and each chip pad group is bonded and connected to each driver circuit MIC in a one-to-one correspondence.

In some embodiments of the present disclosure, the driver circuit MIC may include at least two output pins OUTP, an address pin Di_in, a relay pin Di_out, a chip power supply pin VCCP, a data pin DataP, and a ground pin GNDP. Correspondingly, a chip pad group may include an output pad bonded and connected to each output pin OUTP, an address pad bonded and connected to the address pin Di_in, and a relay pad bonded and connected to the relay pin Di_out, a chip power supply pad bonded and connected to the chip power supply pin VCCP, a data pad bonded and connected to the data pin DataP, a ground pad bonded and connected to the ground pin GNDP, and the like. Further, there are two ground pins GNDP in the driver circuit MIC, and the two ground pins GNDP are arranged adjacently. Correspondingly, there are two ground pads in the driver circuit MIC, and the two ground pads are arranged adjacently. In this way, sufficient electrical connection (for example, having a larger connection area, smaller contact resistance, smaller impedance, and the like) between the ground pins GNDP and the ground voltage wire GNDL may be ensured, and the stability of the ground voltage GND loaded on the driver circuit MIC is improved. In addition, setting the two ground pins GNDP may also avoid setting the ground pin GNDP with a too large area, and also avoid the defect of insufficient bonding force between the ground pin and the ground pad due to the too large area of the ground pin GNDP.

On the array substrate, the setting method of the chip pads in the chip pad group may be set according to the pin arrangement of the driver circuit MIC, as long as it can satisfy the bonding between the driver circuit MIC and the chip pad group, which is not specifically limited in the present disclosure.

In the present disclosure, a substrate 11 of the array substrate may be a substrate of an inorganic material, or a substrate of an organic material, or a substrate formed by laminating and compounding an organic material and an inorganic material. For example, in an embodiment of the present disclosure, the material of the substrate may be glass materials such as soda-lime glass, quartz glass or sapphire glass, or may be metal materials such as stainless steel, aluminum or nickel. In another embodiment of the present disclosure, the material of the substrate may be polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN), or a combination thereof.

Figure 11:
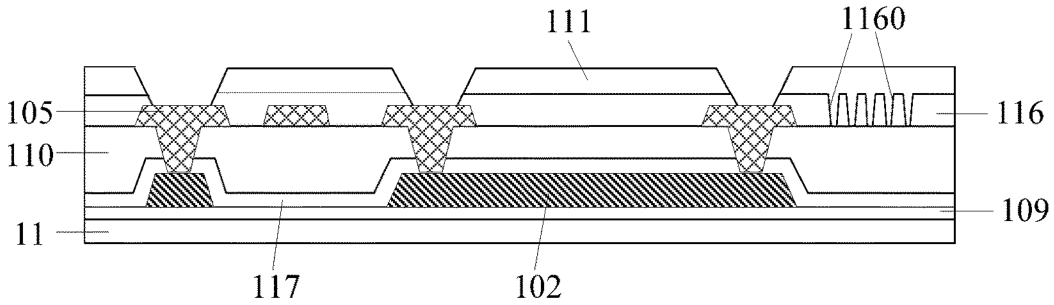
FIG. 11 is a schematic structural diagram of two control areas adjacent to a bonding area according to in embodiment of the present disclosure.

Optionally, referring to FIGS. 10 and 11, the driving circuit layer 200 may include a driving wiring layer 102, a first insulating layer 117 and a metal wiring layer 105 sequentially stacked on a side of the substrate 11. The driving wiring layer 102 may be formed with driving wires for loading signals (for example, the ground voltage wire GNDL, the device power supply wire VLEDL, the address wire ADDRL, the driving data wire DataL, the chip power supply wire VCCL, the feedback wire FBL, and the like). The metal wiring layer 105 may be formed bonding pads (for example, 101/107) and wiring wires WW. The wiring wires WW may be used for electrical connections between bonding pads (for example, between the device pads corresponding to each functional element of the device unit EC) and between the bonding pads and the driving wires (for example, between the chip pads and the driving wires, and between the device pads and the driving wires). The driving wires and the wiring wires may be electrically connected through via holes penetrating the first insulating layer 117. In an embodiment of the present disclosure, the thickness of the driving wiring layer may be greater than the thickness of the metal wiring layer, so as to reduce the square resistance of the driving wires and reduce the voltage drop of the signal on the driving wires.

Optionally, a thickness of the driving wiring layer 102 is about 1.5 μm to 7 μm, and the material of the driving wiring layer 102 may include copper, for example, it may be a laminated layer material such as MoNb/Cu/MoNb formed by sputtering. The material on a side of the laminated layers close to the substrate is MoNb, which has a thickness of about 300 Å and is mainly used to improve the adhesion between the film layer and the substrate. The material of an intermediate layer of the laminated layers is Cu, which is the preferred material for electrical signal transmission channels. The material on a side of the laminated layers away from the substrate is MoNb, which has a thickness of about 200 Å and may be used to protect the intermediate layer and prevent the surface of the intermediate layer with low resistivity from being exposed and oxidized. Since the thickness of a single sputtering generally does not exceed 1 multiple sputtering is required when the driving wiring layer exceeding 1 μm is fabricated. In addition, the driving wiring layer may also be formed by electroplating. Specifically, MoNiTi may be used to form a seed layer to improve the nucleation density of metal grains in the subsequent electroplating process, and then copper with low resistivity may be produced by electroplating, and then an anti-oxidation layer is formed, where the material of the anti-oxidation layer may be MoNiTi. Optionally, a surface of the driving wiring layer on the side away from the substrate may be covered by the first insulating layer, so as to ensure the reliability and stability of the electrical path.

Optionally, the metal wiring layer 105 is provided with pads (e.g., the device pads for bonding functional elements, the chip pads for bonding the driver circuit MIC, and the circuit board pads for bonding external circuits) for bonding with electronic components (e.g., the functional elements, the driver circuit MIC, and the external circuit). The film thickness of the metal wiring layer is about 6000 Å. In order to prevent the problem of oxidation that may occur when the pads are exposed to the air during the process from the array substrate's manufacture procedure to the manufacture procedure of arranging the electronic components on the substrate, the anti-oxidation material layer may only be provided on the exposed surface area of the pads, that is, the surface area of the pads may have one more layer of structure than the area where the wiring wires are located. Alternatively, the metal wiring layer as a whole is provided as a laminated structure of at least two layers, where the material of the film layer thereof away from the substrate is an anti-oxidation metal or alloy material, which may be specifically composed of a laminated structure such as MoNb/Cu/CuNi. The underlying material of the laminated structure is MoNb, which is mainly used to improve adhesion. The intermediate layer of the laminated structure is Cu, which is mainly used to transmit electrical signals due to its low resistivity. The top layer of CuNi in the laminated structure can prevent oxidation of the intermediate layer and ensure the firmness of the connection to the electronic components. The surface of the wiring wires on the side away from the substrate may be covered by a second insulating layer 108 to ensure the reliability and stability of the electrical path.

Exemplarily, in the driving wiring layer, the driving wires may include the device power supply wire VLEDL, the ground voltage wire GNDL, the address wire ADDRL, the chip power supply wire VCCL, the driving data wire DataL, and the like. The wiring wires may be used for electrical connections between the output pins OUTP and the device pads of the device unit EC, between the address pad and the address wire ADDRL, between the chip power supply pad and the chip power supply wire VCCL, between the data pad and the driving data wire DataL, between the device pad of the device unit EC and the device power supply wire VLEDL, and between part of the address pads and the address wire ADDRL.

In some embodiments, the wiring wires may be used for electrical connections between the ground pads and the ground voltage wires GNDL. Of course, in other embodiments of the present disclosure, the ground pads and the ground voltage wires GNDL may also be directly connected through via holes.

Optionally, the array substrate may further include a buffer layer 109 between the substrate 11 and the driving wiring layer 102, and include a first planarization layer 110 between the first insulating layer 117 and the metal wiring layer 105, a second planarization layer 111 and a reflective layer 112 on a side of the second insulating layer 108 away from the metal wiring layer, a transparent electrode 113 on the bonding pad 107 in a peripheral area, and an anisotropic conductive adhesive 114 between the transparent electrode 113 and an external circuit (e.g., a flexible circuit board FPC). The buffer layer 109 may avoid the influence of impurities in the substrate on the conductive performance of the driving wiring layer. The first planarization layer 110 may provide a flat surface for the fabrication of the metal wiring layer 105, and the second planarization layer 111 may provide a flat surface for the subsequent bonding of the functional element FE and the driver circuit MIC. The material of the reflective layer 112 may be white ink to improve the reflectivity of the array substrate to reduce light loss. The transparent electrode 113 and the anisotropic conductive adhesive 114 are used to realize the electrical connection between the bonding pad 107 (e.g., a circuit board bonding pad) in the peripheral area and the flexible circuit board FPC. The material of the substrate may be glass, quartz, plastic, polyimide, PET, PMMA and other materials.

FIG. 11 is a schematic structural diagram of the array substrate according to other embodiments of the present disclosure. The individual functional elements and driver circuits are not shown in FIG. 11. Referring to FIG. 11, the array substrate may include: a substrate 11, a buffer layer 109 on the substrate 11, a driving wiring layer 102 on a side of the buffer layer 109 away from the substrate, a first insulating layer 117 on a side of the driving wiring layer 102 away from the substrate, a first planarization layer 110 on a side of the first insulating layer 117 away from the substrate, a metal wiring layer 105 on a side of the first planarization layer 110 away from the substrate, a second insulating layer 116 on a side of the metal wiring layer 105 away from the substrate, and a second planarization layer 111 on a side of the second insulating layer 116 away from the substrate.

As shown in FIG. 11, the second insulating layer 116 is between the first planarization layer 110 and the second planarization layer 111. When the material of the second planarization layer 111 is an organic insulating material, a plurality of vent holes 1160 may be provided in the second insulating layer 116. The plurality of vent holes 1160 expose a portion of the underlying first planarization layer 110, respectively. In the process of manufacturing the array substrate, the gas collected in the first planarization layer 110 may be released through the vent holes 1160, so as to avoid problems such as warping and peeling of the film layers of the array substrate, thereby improving the product yield.

For example, in the embodiment shown in FIG. 11, the plurality of vent holes 1160 are provided, but this is only illustrative, and not a limitation of the embodiments of the present disclosure. In other embodiments, a greater or lesser number of vent holes may be provided.

In some embodiments of the present disclosure, referring to FIG. 10, the array substrate may further include an encapsulation layer 13 on a side of the device layer away from the substrate. The encapsulation layer 13 includes a layered structure for encapsulating the functional element FE on the substrate. In some exemplary embodiments, an encapsulation adhesive is coated on the surface of the functional element FE in the array substrate, and the encapsulation layer 13 is formed after drying. The material of the encapsulation adhesive may include transparent photocurable or thermally cured resin, that is, the material of the encapsulation layer 13 may be a transparent protective adhesive. In some embodiments, the encapsulation layer 13 may include a plurality of transparent protective structures 30.

Referring to FIG. 10, the pins of the functional element FE are respectively connected to the device pads 101 through solder paste T, and each device pad 101 is connected according to the position of the functional element in the electrical circuit.

It should be noted that although the various steps of the driving method of the driver circuit in the present disclosure are described in a specific order in the drawings, it is not required or implied that the steps must be performed in this particular order, or that all illustrated steps must be performed to achieve desired results. Additionally or alternatively, certain steps may be omitted, multiple steps may be combined into one step for execution, and/or one step may be decomposed into multiple steps for execution, and the like.

Other embodiments of the present disclosure will readily occur to those skilled in the art upon consideration of the specification and practice of the application disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the appended claims.

What is claimed is:

1. A driver circuit, comprising:

a logic control circuit, a data pin configured to receive driving data, wherein the driving data comprises address information and driving information, and at least two output pins, wherein the logic control circuit is configured to obtain, in response to the address information of the driving data matching address information of the driver circuit, the driving information of the driving data; and generate, according to the driving information of the driving data, driving control signals in a one-to-one correspondence with the at least two output pins, and the driving control signals are configured to control current flowing through the corresponding output pins;

wherein the driver circuit further comprises an address pin configured to receive an address signal, and a relay pin, wherein the logic control circuit is further configured to configure the address information of the driver circuit according to the address signal, and generate a relay signal configured to be used as an address signal for a succeeding driver circuit; and the relay pin is configured to output the relay signal;

wherein the driver circuit further comprises a ground pin configured to load a ground voltage to the driver circuit, and a chip power supply pin configured to load a chip power supply voltage to the driver circuit for driving the operation of the driver circuit; and wherein the number of the at least two output pins is four; all pins of the driver circuit are arranged into two pin columns, each pin column of the two pin columns comprising a plurality of pins arranged in a straight line, at least one of the two pin columns comprising five pins; the four output pins are at ends of the two pin columns; the chip power supply pin and the data pin are in different pin columns; and the address pin and the relay pin are in a same pin column.

2. A driving method of a driver circuit, wherein the driver circuit comprises a logic control circuit, a data pin, at least two output pins, an address pin, a relay pin, a ground pin, and a chip power supply pin, wherein the number of the at least two output pins is four; all pins of the driver circuit are arranged into two pin columns, each pin column of the two pin columns comprising a plurality of pins arranged in a straight line, at least one of the two pin columns comprising five pins; the four output pins are at ends of the two pin columns; the chip power supply pin and the data pin are in different pin columns; and the address pin and the relay pin are in a same pin column; and the driving method of the driver circuit comprises:

in an address configuration stage, receiving, by the address pin, an address signal; configuring, by the logic control circuit, address information of the driver circuit according to the address signal, and generating a relay signal configured to be used as an address signal for a succeeding driver circuit; and outputting, by the relay pin, the relay signal;

in a device control stage, receiving, by the data pin, driving data, wherein the driving data comprises address information and driving information; obtaining, by the logic control circuit, in response to the address information of the driving data matching the address information of the driver circuit, the driving information of the driving data, and generating, according to the driving information of the driving data, driving control signals in a one-to-one correspondence with the at least two output pins, wherein the driving control signals are configured to control current flowing through the corresponding output pins.

3. An array substrate, comprising a plurality of device control areas arranged in an array, wherein in any one of the plurality of device control areas, the array substrate is provided with a driver circuit comprising:

an address pin configured to receive an address signal;

a relay pin;

a ground pin configured to load a ground voltage to the driver circuit;

a chip power supply pin configured to load a chip power supply voltage to the driver circuit for driving the operation of the driver circuit;

a logic control circuit, a data pin configured to receive driving data, wherein the driving data comprises address information and driving information, and at least two output pins, wherein the number of the at least two output pins is four; all pins of the driver circuit are arranged into two pin columns, each pin column of the two pin columns comprising a plurality of pins arranged in a straight line, at least one of the two pin columns comprising five pins; the four output pins are at ends of the two pin columns; the chip power supply pin and the data pin are in different pin columns; and the address pin and the relay pin are in a same pin column; wherein the logic control circuit is configured to obtain, in response to the address information of the driving data matching address information of the driver circuit, the driving information of the driving data; and generate, according to the driving information of the driving data, driving control signals in a one-to-one correspondence with the at least two output pins, and the driving control signals are configured to control current flowing through the corresponding output pins; wherein the logic control circuit is further configured to configure the address information of the driver circuit according to the address signal, and generate a relay signal configured to be used as an address signal for a succeeding driver circuit, the relay pin being configured to output the relay signal, and device units in a one-to-one correspondence with the at least two output pins of the driver circuit, any one of the device units comprising one functional element or a plurality of electrically connected functional elements.

4. The array substrate according to claim 3, wherein the plurality of device control areas are arranged into a plurality of device control area columns, and any one of the plurality of device control area columns comprises a plurality of device control areas arranged in sequence along a column direction;

in any one of the plurality of device control area columns, the array substrate is provided with a device power supply wire and a driving data wire extending along the column direction;

one end of a device unit is electrically connected to the device power supply wire, and the other end of the device unit is electrically connected to the corresponding output pin; and the data pin is electrically connected to the driving data wire, wherein the driving data wire is configured to transmit the driving data to the data pin.

5. The array substrate according to claim 4, wherein driver circuits in a same device control area column are cascaded in sequence;

in any one of the plurality of device control area columns, the array substrate is provided with a plurality of address wires in a one-to-one correspondence with the driver circuits, and each address wire of the plurality of address wires extends along the column direction; and the address pin of the driver circuit is electrically connected to the corresponding address wire, and the relay pin of the driver circuit is electrically connected to an address wire corresponding to the driver circuit at a next stage.

6. The array substrate according to claim 5, wherein in any one of the plurality of device control area columns, the array substrate is further provided with a chip power supply wire and a ground voltage wire extending along the column direction; and the chip power supply pin electrically connected to the chip power supply wire; and the ground pin electrically connected to the ground voltage wire.

7. The array substrate according to claim 6, wherein in any one of the plurality of device control area columns, the device units are arranged into two device unit columns, and any one of the two device unit columns comprises a plurality of device units arranged in sequence along the column direction;

in any one of the plurality of device control area columns, two device power supply wires are provided, the two device power supply wires being respectively on two sides of the ground voltage wire and in one-to-one correspondence with the two device unit columns; and the plurality of device units in the two device unit columns are electrically connected to the corresponding device power supply wires.

8. The array substrate according to claim 7, wherein in any one of the plurality of device control area columns, the address wire, the driving data wire and the chip power supply wire are all between the two device power supply wires.

9. The array substrate according to claim 3, wherein the plurality of device control areas are arranged into a plurality of device control area columns, and any one of the plurality of device control area columns comprises a plurality of device control areas aranged in sequence along a column direction;

in any one of the plurality of device control area columns, the array substrate is provided with a device power supply wire and a ground voltage wire extending along the column direction;

in at least one of the plurality of device control area columns, the array substrate is further provided with a feedback wire between the device power supply wire closest to the feedback wire and the ground voltage wire; and in the at least one of the plurality of device control area columns, the relay pin of the driver circuit at the last stage is connected to the feedback wire.

10. The array substrate according to claim 7, wherein in two adjacent device control area columns, two adjacent device power supply wires are connected to each other into one wire.

11. The array substrate according to claim 7, comprising a substrate, a driving circuit layer and a device layer stacked in sequence;

wherein the driving circuit layer comprises a driving wiring layer, an insulating layer and a metal wiring layer sequentially stacked on the base substrate, a thickness of the driving wiring layer being greater than a thickness of the metal wiring layer;

the ground voltage wire, the device power supply wire, the chip power supply wire, the driving data wire and the address wire are located in the driving wiring layer; and the metal wiring layer is provided with a device pad, a chip pad and a wiring wire;

the functional element and the driver circuit are located in the device layer, the functional element being bonded and connected to the device pad, the driver circuit being bonded and connected to the chip pad, the device pad and the chip pad being electrically connected to the driving wiring layer through the wiring wire.

12. A display device comprising the array substrate according to claim 3.

13. The display device according to claim 12, wherein the plurality of device control areas are arranged into a plurality of device control area columns, and any one of the plurality of device control area columns comprises a plurality of device control areas arranged in sequence along a column direction;

in any one of the plurality of device control area columns, the array substrate is provided with a device power supply wire and a driving data wire extending along the column direction;

one end of a device unit is electrically connected to the device power supply wire, and the other end of the device unit is electrically connected to the corresponding output pin; and the data pin is electrically connected to the driving data wire, wherein the driving data wire is configured to transmit the driving data to the data pin.

14. The display device according to claim 13, wherein driver circuits in a same device control area column are cascaded in sequence;

in any one of the plurality of device control area columns, the array substrate is provided with a plurality of address wires in a one-to-one correspondence with the driver circuits, and each address wire of the plurality of address wires extends along the column direction; and the address pin of the driver circuit is electrically connected to the corresponding address wire, and the relay pin of the driver circuit is electrically connected to an address wire corresponding to the driver circuit at a next stage.

15. The display device according to claim 14, wherein in any one of the plurality of device control area columns, the array substrate is further provided with a chip power supply wire and a ground voltage wire extending along the column direction; and the chip power supply pin electrically connected to the chip power supply wire; and the ground pin electrically connected to the ground voltage wire.

16. The display device according to claim 15, wherein in any one of the plurality of device control area columns, the device units are arranged into two device unit columns, and any one of the two device unit columns comprises a plurality of device units arranged in sequence along the column direction;

in any one of the plurality of device control area columns, two device power supply wires are provided, the two device power supply wires being respectively on two sides of the ground voltage wire and in one-to-one correspondence with the two device unit columns; and the plurality of device units in the two device unit columns are electrically connected to the corresponding device power supply wires.

* * * * *